(12) United States Patent
Templeman

(10) Patent No.: US 7,731,588 B2
(45) Date of Patent: Jun. 8, 2010

(54) REMOTE VEHICLE CONTROL SYSTEM

(75) Inventor: James N Templeman, Springfield, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 722 days.

(21) Appl. No.: 11/528,646

(22) Filed: Sep. 28, 2006

(65) Prior Publication Data

US 2007/0072662 A1 Mar. 29, 2007

Related U.S. Application Data

(60) Provisional application No. 60/722,085, filed on Sep. 28, 2005.

(51) Int. Cl.
G06F 17/00 (2006.01)
G06F 19/00 (2006.01)

(52) U.S. Cl. .............. 463/38; 463/36; 463/37; 463/39; 446/454; 446/460; 446/468

(58) Field of Classification Search .......... 463/7, 463/36–39; 318/6, 9, 11, 14, 16; 446/454, 446/460, 468; 345/8
See application file for complete search history.

(56) References Cited

U.S. PATENT DOCUMENTS

| | | | |
|---|---|---|---|
| 4,334,221 A * | 6/1982 | Rosenhagen et al. .......... 463/6 |
| 4,386,346 A | 5/1983 | Levine |
| 4,691,659 A * | 9/1987 | Ito et al. ............... 114/144 R |
| 4,824,111 A * | 4/1989 | Hoye et al. ................ 463/37 |
| 5,059,958 A | 10/1991 | Jacobs et al. |
| 5,191,641 A | 3/1993 | Yamamoto et al. |
| 5,436,638 A | 7/1995 | Bolas et al. |
| 5,874,942 A * | 2/1999 | Walker ................. 345/158 |
| 6,025,790 A * | 2/2000 | Saneyoshi ............... 340/946 |
| 6,369,952 B1 | 4/2002 | Rallison et al. |
| 6,612,925 B1 * | 9/2003 | Forsberg ................. 463/6 |
| 6,646,643 B2 | 11/2003 | Templeman |
| 6,694,228 B2 * | 2/2004 | Rios ....................... 701/2 |
| 6,697,715 B1 * | 2/2004 | Freeman ................. 701/2 |
| 6,857,930 B1 * | 2/2005 | Lawley, Jr. ............. 446/456 |
| 6,887,158 B2 | 5/2005 | Goto et al. |
| 7,062,367 B2 * | 6/2006 | Kim ....................... 701/37 |
| 7,094,153 B2 | 8/2006 | Kunieda et al. |
| 7,127,333 B2 * | 10/2006 | Arvidsson ............... 701/2 |

(Continued)

*Primary Examiner*—Scott Jones
*Assistant Examiner*—Milap Shah
(74) *Attorney, Agent, or Firm*—Amy L. Ressing; Kerry Broome

(57) ABSTRACT

An apparatus for remotely controlling the movements of a vehicle includes a user input means, such as a gamepad with a plurality of joystick-controlled and button-controlled outputs, a tracker, and optional sliding foot pedals; a processor for running a control mapping algorithm; and a remote vehicle controller. A control mapping algorithm maps the outputs to the remote-controlled vehicle's course, heading, displacement, and camera view, with the joysticks mapped to provide open loop directional control over the vehicle's course and heading, the tracker providing open loop control over the camera view, and the optional sliding foot pedals providing open loop control over the vehicle's displacement. The remote vehicle controller sends commands to on-board controls to direct the vehicle's movement. A video stream from an on-board camera is transmitted back to the operator station for viewing on a computer desktop display or a head mountable display.

36 Claims, 12 Drawing Sheets

U.S. PATENT DOCUMENTS

| | | |
|---|---|---|
| 7,137,891 B2 | 11/2006 | Neveu et al. |
| 7,176,893 B1 * | 2/2007 | Larkin ........................ 345/161 |
| 7,235,012 B2 * | 6/2007 | DiDato ........................ 463/38 |
| 7,312,766 B1 * | 12/2007 | Edwards ........................ 345/8 |
| 7,343,232 B2 * | 3/2008 | Duggan et al. ................ 701/24 |
| 7,402,964 B1 * | 7/2008 | Calhoun ........................ 318/9 |
| 7,471,216 B2 * | 12/2008 | Chen et al. .................... 341/20 |
| 2002/0142701 A1 * | 10/2002 | Rosenberg .................. 446/454 |
| 2003/0060906 A1 * | 3/2003 | Kim ............................ 700/56 |
| 2003/0210228 A1 | 11/2003 | Ebersole et al. |
| 2004/0238732 A1 * | 12/2004 | State et al. .................. 250/250 |
| 2005/0059489 A1 * | 3/2005 | Kim ............................ 463/36 |
| 2005/0277470 A1 * | 12/2005 | Watanachote ................ 463/37 |
| 2006/0223637 A1 * | 10/2006 | Rosenberg .................. 463/47 |

* cited by examiner

User's Physical Body

REMOTE VEHICLE CONTROL SYSTEM

CROSS-REFERENCE TO RELATED APPLICATIONS

This Application is a Non-Prov of Prov (35 USC 119(e)) application 60/722,085 filed on Sep. 28, 2005 and incorporated herein by reference. This application is related to U.S. application Ser. No. 11/528,341 (now, U.S. Pat. No. 7,528, 835), entitled "OPEN-LOOP CONTROLLER", filed concurrently herewith.

FIELD OF THE INVENTION

The present invention relates generally to a method and apparatus for allowing a user to remotely control the movements of a vehicle in a physical environment, including the course, heading, displacement and view. In particular, the present invention relates to such a method and apparatus where a user can control the vehicle motion through its environment by operating a set of control input devices.

BACKGROUND OF THE INVENTION

A virtual environment (VE) is an array of sensory cues generated in response to a user's actions that gives the user the impression of dealing directly with a three dimensional model. Typically either a head mounted or fixed display is used to present a dynamic perspective image of the visual environment as the user moves within the VE. The virtual environment may be synthetically generated within a computer or may involve sensory input from a remote physical location (as in tele-operations). Virtual locomotion is movement over long distances in a virtual environment which is controlled by a user remaining within a relatively small physical space.

An avatar is a computer model of an articulated human figure that depicts the user's body in the virtual environment. The motion of the avatar is controlled by the user. When the user has a first-person view he sees the virtual world through the eyes of the avatar, so that the view of the VE changes as the avatar's head turns and translates through the VE. The major components of the avatar's motion involves locomotion: orienting and moving the body over the terrain. This will be the primary focus of the controls described herein. The new approach to controlling the avatar's motion also addresses turning the head to look around, and adopting different stances and postures. These secondary aspects of motion will be addressed after control over the major aspects of locomotion has been covered.

Virtual locomotion can be used for a variety of purposes, such as: training or rehearsal in executing skills, tasks, strategies, and navigation that involve moving through an environment on foot; planning activities that involve moving through a target environment; evaluating the ergonomics or aesthetics of structures designed for human habitation, or of devices intended for mobile operation; piloting remote surface vehicles; communications between people at different locations when they want to relate to each other in a way that involves locomotion; and entertainment experiences that involve moving through a virtual environment. Particular applications would include training people to perform hazardous tasks without risking bodily harm or to train soldiers in combat simulators where the soldier interacts with the surrounding environment which includes other members of a team.

We adopt terms used in both vehicular and human navigation literature to describe different types of locomotion. When focusing on locomotion we will assume, in order to facilitate our explanation of the invention but without being expressly limited by the depictions in the figures, that the head remains level, faces straight-ahead, and maintains a fixed alignment with the rest of the upper-body as pictured in the figures. There are three components of motion in the horizontal plane. Heading is the angular direction the upper-body faces; course is the angular direction the pelvis translates; and displacement is the distance the pelvis translates along the course. The first two components specify orientation with respect to a fixed reference direction and the third specifies distance traveled. The alignment-offset is the angle between the course and heading. The angle between the direction of a step (course) and the direction of the upper body (heading) determines the kind of step being taken (FIG. 1). A figure or avatar 1 representing a person in a virtual environment is depicted from above with arms extended holding a rifle. Accordingly, the rifle is shown aligned in the direction the avatar 1 is facing, in FIG. 1 and in subsequent figures (unless indicated otherwise), such that avatar 1's heading is aligned in the direction of the held rifle while the bold-face arrow under avatar 1 indicates its course.

The application of course, heading and displacement yields (at any point in time) a position and orientation in 3 degrees-of-freedom (DoF): the X,Y position on the ground and a Yaw rotation about the vertical axis of the global coordinate frame. (Degrees-of-Freedom (DoF) is defined as the number of independent variables describing the state of a system or device. A basic computer mouse, for example, provides 2-DoF since it reports continuous X and Y displacements as it moves over a surface.)

Classification of Human Locomotion

We have developed a means of classifying the kinds of motion a person can make while walking or running in the real world in terms of how course and heading vary. This new classification of motion is useful for characterizing existing systems as well as for explaining the new collection of open loop controls of the invention as elaborated on below. All the kinds of motion shown in FIG. 2 involve avatar 1 moving along a path, with the consecutive positions of avatar 1 for each of three positions indicated sequentially by the direction of the arrow alongside, and again (as in FIG. 1) with the avatar 1's heading in each instance being aligned with the rifle while the bold-face arrow under avatar 1 indicates its course (here and also in subsequent figures). Although a person can also turn the heading without translating by twisting the pelvis or stepping to turn in place, those motions are not depicted. We define four classes of motion. Steering Motion: Course and heading remain co-aligned while moving along a path (FIG. 2, upper left). Steering motion can be used to move directly towards a stationary or moving target and to follow a route marked out on the ground by facing forward along the trail. Canted Motion: Course and heading maintain a fixed alignment-offset (defined above) while moving along a path (FIG. 2, upper right). Steering motion is a sub-class of canted motion. Note that stepping backward along a path is also an example of canted motion (with a fixed alignment-offset of 180 degrees), but may also be thought of as steering in reverse. Oblique Motion: Heading remains in a fixed direction while moving along a path (FIG. 2, lower left). Notice that moving along a straight path with a fixed alignment-offset qualifies as both canted and oblique motion (as shown on the left in each respective panel), so the classes of motion partially overlap. Scanning Motion: Heading is free to turn separately from the course while moving along a path (FIG. 2, lower right). Scanning motion can be used to search from side-to-side while moving or to remain directed towards a stationary or moving target, while traversing a straight or curved path. Scanning while traversing a curved path is the only case where both the heading and course vary independently.

Definitions Relating to Viewing

A virtual locomotion control directs the user's avatar through the virtual world and determines, at any given point in time, its situated-heading. The situated-heading is the global 4-DoF (X, Y, Z, Yaw) position and orientation of the avatar's head when the avatar is in an upright stance looking straight ahead. (There are actually only 3 degrees of freedom in the situated-heading since the Z coordinate is not under the user's control, but only varies with the height of the avatar.) Relative to its situated-heading, the avatar may be directed to crouch, lean, look up, down or to the side. The head-pose is the resultant 6-DoF translation and rotation of the avatar's head relative to the situated-heading. The head-pose combines with the situated-heading to yield the avatar's viewpoint, which is the global 6-DoF displacement and orientation of the avatar's head in the virtual world. The viewpoint determines the user's first-person view of the virtual world as seen through the eyes of the avatar.

When controlling a remote vehicle, the avatar's head depicted in the accompanying figures corresponds to the remote vehicle's turret (where control cameras are mounted that provide images of the actual environment in which the remote controlled vehicle exists). Thus, the situated-heading is the global 4-DoF position and orientation of the vehicle's turret when the turret is aligned with the vehicle's chassis. The head-pose is the 6-DoF translation and rotation of the turret relative to the situated heading, and the head-pose is combined with the situated-heading to yield the vehicle's viewpoint. The viewpoint determines the user's view of the virtual world as seen through the lenses of one or more cameras attached to the vehicle's turret.

Definitions Relating to Controls

The following terms are used to describe controls. Input Control Device: a physical mechanism a user moves or applies forces to. The movement or forces are sensed, digitized, and transmitted to a computer. Control Mapping: the transformation of control input to the resulting motion of a controlled element (i.e., all or part of a vehicle or avatar). Turning the steering wheel of an automobile, for example, turns the orientation of a set of tires which turns a vehicle in motion. Rate Control: a control that maps the position or displacement of (or force applied to) an input device to the speed of a controlled element. There are rate controls over translation and rotation. Positional Control: a control that maps the position or displacement of (or force applied to) an input device to the position of a controlled element. Position may refer to either translation or rotation. For example, translating an input device might alter the rotation of a controlled element. Translational Control: a positional control which controls translation. Directional Control: a positional control which controls rotation.

The following additional terms are used to further describe controls. Closed Loop Control: a control that requires additional sensory feedback (to that described for "Open Loop Control", below) for the user to determine how far a controlled element has turned or translated. Joysticks used to control the rate of turning the heading provide a good example of a closed loop control. The user pushes a joystick to one side and then watches the display to determine how far the view has turned. (In theory, if the exact time sequence with which the joystick is deflected is known and the mapping between the deflection and rate of turning is known, it is possible to determine how far the view has turned; but in practice people rely on visual feedback, since their ability to estimate the extent of turning is limited when deprived of visual (or auditory) feedback.) Open Loop Control: a control in which the user is aware of the extent of a translation or rotation of a controlled element (e.g. an avatar or a remote controlled vehicle) as he enters it with the input device. The user feels the position of the input device (or force applied to it) to sense the turn or translation without the need of further visual or auditory feedback in response to his action. Open loop control is therefore independent of external feedback such as visual or auditory cues but benefits from internal sensory feedback (e.g., the sense of touch). Open loop controls are typically positional controls with a constant mapping between the distance, angle, or force applied to the input device and the resulting effect. A positional control is not necessarily an open loop control or at least solely open loop. For example, a relative positional control (like a mouse) provides open loop control over the change in position but only provides closed loop control over absolute position (of a cursor on the screen).

The term tracker as used herein includes the following: A tracking system made up of a set of components that allow a position detector to determine one or more of the spatial coordinates (X, Y, Z, Yaw, Pitch, Roll) of one or more tracked elements (e.g., parts of the body). Many tracking systems require the attachment of one or more tracking components to the tracked element. A "sensor" is a device that registers specific forms of structured energy. Position detectors take in readings from one or more sensors to determine the coordinates of tracked elements. In the case of a conventional optical tracking system, a set of markers is attached to the element to be tracked, visible to optical sensors mounted in the room. Other tracking technologies, including acoustic and potentially Radio-Frequency tracking, may adopt a similar configuration. One or more emitting or reflective elements for the sensed form of transmitted energy is attached to the tracked element and sensors are placed in the room. Another configuration is to place the sensor(s) on the element to be tracked and place emitting or reflective elements as points of reference in the room. Some sensors can detect their own motion without the need for reference markers: Inertial sensors can register translational or rotational accelerations which can be integrated (twice) over time to determine translational or rotational displacements. Inclinometers use the earth's gravity to sense tilt. Magnotometers can register their orientation with respect to the earth's magnetic field. Such sensors are mounted directly on the tracked element. Another approach is to use optical sensors to track with, but to use the natural visual features as reference points, instead of applying a special set of markers (emitters or reflectors). In that case the optical sensors could either be mounted in the room with the receiving aperture directed towards the tracked element, or the optical sensors could be mounted on the tracked element and look for visual features of the surrounding room to sense its own motion. A tracker can also employ instrumented mechanical linkages to connect the tracked element to a known frame of reference. The change in the relative positions of the linkages are sensed and those readings are fed into a position detector.

Vehicular Controls

A wide range of controls for ground vehicles exist. Different kinds of vehicles often use different controls, but this is not always the case. Automobiles and trucks typically use steering wheels, foot operated brakes and accelerators, and a means of shifting the transmission. Motorcycles and bicycles use handle-bars for steering, with hand-brakes and shift controls mounted on the handle-bars. The controls of vehicles are often directly tied to the physical mechanisms used to impart motion or redirect the motion of the vehicle. In a car the accelerator increases the power generated by the engine, the brakes apply friction to stop the wheels from turning, the steering wheel turns a pair of the car's wheels. The driving controls give the user fairly direct control over the operation of the vehicle. Such an approach tends to bias the nature of the controls in a number of ways. Often rate controls are adopted because that is how the mechanics of the vehicle works. An automobile's steering wheel provides a rate control over turning. An automobile continues turning so long as the steering wheel remains turned to the side. A second bias is that many vehicles only support steering motion. Thus with a car the course and heading remain co-aligned while the car advances, except when the contact between the wheels and ground slips and the vehicle slides across the surface. There are exceptions, however, such as a tank with a turret that rotates independently of the main chassis. Since one can associate heading with the alignment of the turret, the "upper body" of a tank, while the course aligns with the main chassis, the two can turn independently. Treaded vehicles like tanks and some tractors also have treads on each side that may be rotated independently. Turning the treads in opposite directions turns the vehicle in place, unlike an automobile.

Contrasting Vehicular Controls with Natural Human Bipedal Locomotion

The controls used to drive ground vehicles do not provide as wide a range of maneuvers as are readily achieved using foot-based locomotion. The human body is controlled differently. There is no single part of the body that corresponds to the main chassis of a vehicle. Different parts of the human body can turn and translate relative to one another. Different actions can contribute to turning the heading: When standing, the legs can swivel at the hip and ankle joints to turn the pelvis and the rest of the upper body relative to the feet. Pivoting the feet on the ground or stepping to turn turns the feet with respect to the ground. The primary means of displacement (displacing the body) via natural locomotion is by stepping. The feet are successively raised and translated above the ground as steps are taken. This translates the body over extended distances. Shifting the pelvis between the support feet provides additional local displacement. Humans also have a direct vestibular sense of how much the head has turned, an internal, proprioceptive sense of the position of every part of the body, and a central nervous system that integrates all this information to allow a person to maintain their course even though different parts of the body may turn in different directions to achieve different effects. A man on foot is more maneuverable than a tank: Even though a tank may control the heading of its turret independently of its course, a tank cannot change its course as abruptly as a man can (e.g., to step to the side); a tank must first turn its main chassis to move in a new direction.

Conventional Controls Used for Virtual Locomotion

Controlling the motion of the user's avatar or vehicle is a key element of a wide variety of computer games and simulations. A variety of controls are available for that purpose. This section describes commonly used control devices and the conventional control mappings which are applied to their inputs.

2-DoF Joystick

We classify a typical joystick as a 2-DoF centering input control device. The normal orientation of a spring centered joystick (JS) is vertically upright, from the surface it is mounted on. The joystick may be pushed off center in any direction. The direction of a joystick can be specified by a yaw angle (analogous to a compass heading). The deflection of a joystick is how far it is pushed in any direction from being vertically upright. When a joystick is released it springs back to an upright centered position. Another way of describing a joystick's motion is to say that it may be deflected to either side of two orthogonal (X-Y) axes, with one axis running front-to-back and the other side-to-side. Basic joysticks provide two DoF which can be considered either as the direction and deflection of the stick or as two orthogonal axes of deflection.

Joysticks have conventionally been used as rate control devices. They are also frequently treated as dual control devices in which the two orthogonal axes control two independent variables. When controlling motion, they are typically linked to two different aspects of motion, such as the rate of turning and the speed of translation.

In the early days of 3D computer games, a single joystick was used to move an avatar about through a computer generated landscape. The deflection of the joystick along its front-to-back axis sets the avatar's rate of displacement. Pushing the JS straight forward moves the avatar straight ahead; pulling the JS straight back reverses the motion; centering the JS stops the avatar. The further the JS is pushed forward or back, the faster the avatar translates in that direction, thus the front-to-back axis of the joystick provides rate control over displacement. The deflection of the joystick along its left-to-right axis sets the rate at which the course and heading turn together, thus the left-to-right axis provides rate control over steering. Pushing the JS to the left steers to the left; pressing the JS to the right steers to the right. The further the JS is pushed to either side, the faster the course and heading turn together in that direction. The heading always faces in the direction of forward motion, while the avatar moves either straight ahead or in reverse. The course and heading turn together in place (without translation) when the JS is pushed exclusively to one side or the other. Pushing the JS in a diagonal direction engages both steering and translation, so the avatar turns while advancing (or retreating). This control mapping does not support oblique, canted, or scanning motion since course and heading remain co-aligned. Additional input is required to provide access to that range of motion.

Gamepad: Dual 2-DoF Joysticks

Gamepads are widely used to control virtual locomotion in many first-person shooter games, especially on game consoles. Referring now to FIG. 3, a gamepad 2 provides a pair of 2-DoF thumb-joysticks 3 and 4 used to change the course, heading, and displacement of the user's avatar. The controls are applied in a fairly standard manner. In the right-hand figure, the deflection of the right joystick 3 along its left-to-right axis sets the rate at which the course and heading turn together, providing rate control over steering. (Deflecting this joystick along its front-to-back axis sets the rate at which the head-pose pitches up or down, but is not part of locomotion.) We call the right joystick 3 the steering joystick (FIG. 3, right). Pushing the steering joystick to its full leftmost extent turns course and heading together to the left at a maximum angular rate (degrees per second). Pushing it only partially over to the right turns them to the right at a slower rate.

The left joystick 4 (note—the abbreviation "JS" will be used interchangeably for the term "joystick" herein) is typically considered to be a two-axis (X-Y) rate control over X-Y translation in a reference frame that turns with the heading, as shown in the left-hand figure of FIG. 3. There is, however, a functionally equivalent interpretation that factors its control over the course and displacement (and fits in better with the new approach presented in the description of the invention, below). We prefer to describe the operation of this JS in terms of polar coordinates (R-Theta): The deflection (R) of the left joystick in any direction sets the rate of displacement. The angular direction (Theta) in which the left joystick is pushed determines the direction of the course relative to the current heading (FIG. 3, left). In general, we call the left joystick 4 the offset joystick because it controls the alignment-offset in a variety of different control mappings of dual joystick gamepads. In particular, we call the angular offset of the course with respect to the heading the course-offset. With this interpretation the offset joystick provides directional control over the course-offset and rate control over displacement. When the offset joystick is solely engaged, the course is redirected and the heading remains unchanged. FIG. 1 above shows examples of alignment-offsets in terms of stepping patterns: Pushing the offset joystick forward directs the course forward (forward step); pushing it left or right moves the course to the side relative to the heading (side step); pushing it back directs the course back (back step); and pushing it on the diagonal produces a diagonal course relative to the heading (diagonal step). Pushing only the offset joystick without engaging the steering joystick (i.e. joystick 3) moves the avatar in a straight trajectory in the specified direction; deflecting the steering joystick without engaging the offset joystick turns the avatar in place. In summary, the offset joystick redirects the course without altering the heading. The steering joystick controls the rate at which the course and heading turn together. Therefore, we categorize the conventional gamepad control mapping as a course-offset control mapping, with rate control over steering and directional control over course-offset.

The conventional gamepad control mapping described above is typical for controlling first-person shooter games. In addition, it is common for games to add additional control mappings which allow the user to assign different functions, polarities, ranges, and scales to the joysticks and buttons provided by gamepads. These currently available options do not include the new forms of open loop controls described in this invention.

Executing Different Classes of Motion with the Conventional Gamepad Control Mapping The steering and offset joysticks are manipulated (control action) to move the user's avatar through the virtual world (control effect). Because of the way the joystick actions control course, some classes of motion are easier to achieve than others. Moreover, redundant control over course gives rise to a multitude of different ways of entering the same final course.

Steering motion requires deflecting the steering joystick while pushing the offset joystick forward. The situated-heading changes as the heading turns and the avatar advances along the trail. Steering motion is controlled in a closed loop manner because the user relies on visual feedback to determine the extent of rotation and translation. Both steering and displacement are rate controlled. Oblique motion is accomplished using only the offset joystick. Heading remains fixed in the current direction because no steering occurs. The user enters the course simply by pushing the offset joystick in the desired direction without need of visual feedback. Therefore, oblique motion is controlled in an open loop manner. The user continually feels the current direction of the course-offset. Scanning motion following a straight path is difficult using conventional gamepad controls. Referring now to FIG. 4, the steering joystick must turn the heading to scan, but the course turns along with it (FIG. 4, left). To follow a straight path (FIG. 4, right), the offset joystick must counterturn to cancel out this rotation of the course (FIG. 4, middle), as indicated by "summing" the left and middle figures to obtain or equal the motion shown in the right figure. It is difficult to balance the two forms of turning since one joystick is controlled by rate and the other by direction. Without knowing how far the steering joystick changes the course direction, the user does not know where to point the offset joystick to counter it. Scanning motion following a curved path is even more difficult using such controls.

Conventional gamepad controls favor visually directed motion because rate-based steering relies heavily on visual feedback. Both canted and scanning motions allow the avatar to turn to face a target while moving along a path. Users compensate for the weakness in executing scanning motion by relying heavily on canted motion. They adopt a control strategy called targeted canted motion in which the heading is constantly turned toward the target while the alignment-offset of the course and heading remains fixed in order to direct them together as a unit. Targeted canted motion is performed by deflecting the steering joystick while holding the offset joystick in a fixed direction. A family of spiral trajectories emerges by doing so, as shown in FIG. 5. A sophisticated user can smoothly transition between these trajectories to achieve even more complicated paths. The term strafing is used in the gaming community to denote oblique motion, shooting while moving obliquely, and the form of targeted canted motion just described. Circle-strafing is the tactic of circling a target while facing toward it.

Dual 2-DoF Joystick Control of Turreted Vehicles

A hybrid control mapping exists for controlling tanks in simulation games and remotely controlled turreted vehicles. It controls the main chassis using one joystick and turns the turret and elevates the gun with the second joystick. The JS controlling the main chassis works as described above regarding how a single 2-DoF joystick is used to drive an avatar in early 3D computer games: Front-to-back movement of this JS controls the speed of the tank while side-to-side motion of the JS steers the tank chassis. The other JS controlling the turret and gun elevation operates as a rate control over the turret and gun elevation: Deflection of the joystick along its left-to-right axis sets the rate at which the turret revolves; deflection of the joystick along its front-to-back axis sets the rate at which the tank's main gun elevates, pitching up or down.

Since the heading of the tank corresponds to the direction in which the turret faces, this dual joystick control provides two ways of turning the heading: (1) The turret is carried along as the chassis turns under it, and (2) the second JS allows the turret to turn with respect to the chassis. The tank's course remains aligned with the chassis because the tank translates along the treads suspended from the chassis. The left-to-right axis of the second JS provides rate control over turning the heading-offset, i.e. the angular offset of the heading with respect to the course. (The front-to-back axis of the second JS provides rate control over the gun's pitch, but this is not part of locomotion.) In terms of a tank, the heading-offset corresponds to the orientation of the turret with respect to the tank's chassis. Heading-offset control exerts a different kind of control than the more widely used course-offset control previously described for controlling human locomotion (see FIG. 3), where the second JS provides control over the course-offset.

Heading-offset control makes it easy to execute scanning movement while moving along a straight path. Since the turret can turn independently of the main chassis, the user can maintain the course with one JS while turning the heading of the turret with the other JS to scan in different directions. The tank continues to move in a straight path while the turret turns to look about. The advantages of heading-offset control will be further described in the description of the invention below.

Because it is rate-based, this type of heading-offset control has a major problem: the user loses track of the course when both JS controls are adjusted at once. The heading turns both during steering and scanning (using both the steering JS and the heading-offset JS). This redundant means of turning the heading can be confusing. Since both steering and heading-offset turns are performed via rate control, this approach provides closed loop control over both course and heading. Thus the user must rely on the changing visual scene to judge how far his heading has turned. If the user only steers the chassis or turns the turret (heading-offset)—one at a time—the extent of each heading change can be visually estimated. Even then, the user will have to remember how much the heading has turned separately from the course, because there is no information available from a static first person view, looking in the direction the turret is facing, to tell the user how the heading is aligned with the course (i.e., how the turret is oriented on the tank chassis). If the chassis turns in place to redirect the course while the turret simultaneously counter-turns to retain the heading direction, there is no visual indication from a first-person view how far the chassis has turned. The user loses track of where he will go when the steering JS is pushed straight ahead to 'advance'. If the tank is translating and the turret has stopped turning the course can be inferred from optic flow. The center of outward optic flow specifies the direction of locomotion. If this point is within the visible field-of-view the user will perceive the tank is moving towards it.

This control mapping makes accurate control over oblique movement difficult. There is no reliable way of executing a side-step movement. If the user counter-turns the heading-offset JS to keep the heading facing forward while steering to go sideways he will not know when the course has reached the desired 90° orientation.

Although a straight course can be maintained while scanning, it is difficult to scan following a curved path since it involves turning the chassis and turret at the same time. In so doing the user loses track of the course. Awareness of one's course and heading is vital. Without it the user cannot make full use of the tactical movement capabilities of heading-offset control.

3-DoF Joystick

Some joysticks provide a third DoF by allowing the user to twist the shaft of the JS to turn it in either direction. Such JS are spring-loaded to return the shaft back to a neutral (centered) position upon release. This third axis typically provides a rate control over steering. The more the shaft is twisted in one direction the faster the course and heading turn together in that direction. That assignment frees up the side-to-side motion of the JS to control other aspects of motion.

The side-to-side and forward-and-back deflections of the joystick provide a two-axis (X-Y) rate control over X-Y translation in a reference frame that turns with the heading. This is equivalent to the mapping of the offset joystick of a conventional dual joystick gamepad used to control the avatar's locomotion. As for that mapping, the deflections of the JS may be described in terms of polar coordinates (R-Theta): The deflection (R) of the JS in any direction sets the rate of displacement. The angular direction (Theta) in which the JS is pushed determines the direction of the course relative to the current heading (i.e., the angular offset of the course with respect to the heading). The movement of the joystick thus provides directional control over the course-offset and rate control over displacement.

The 3-DoF JS uses a control mapping similar to that used with the conventional dual joystick gamepad. It is a course-offset control mapping, with rate control over steering and directional control over course-offset. Since scanning motion is difficult to control, it also relies heavily on targeted canted motion for turning the avatar to face a target while moving along a path.

Keyboard and Mouse Controls

The mouse is an input device that provides a 2-DoF relative positional input. The mouse is active when in contact with the surface it strokes over. The input from the mouse does not change when it is lifted and repositioned, making the mouse a relative translational input device. The input of a mouse can be mapped in different ways to control different things. Mice are often used to steer a cursor around on a display screen. In that case a 2-DoF relative translational input is used to control a 2-DoF absolute translational output. The motion of the mouse may be rescaled to drive the motion of the cursor. This scaling is referred to as the control-to-display (CD) ratio. The recent trend in applying these devices has been to vary the CD ratio based on the velocity to obtain more precision of control when moving at slow speeds. Example patents describing rate dependent adjustment of the CD ratio include: U.S. Pat. No. 5,191,641, Yamamoto, et al., issued Mar. 2, 1993, and U.S. Pat. No. 4,386,346, James L. Levine, issued May 31, 1983.

Input from a mouse is also often used to control a person's view of a 3D computer generated scene. Although there are a wide variety of mappings used to adjust one's view, one of the most widely used approaches, especially in first-person-shooter computer games, is to use the 2-DoF mouse input to control rotational components of the avatar's viewpoint. Side-to-side movements of the mouse adjust the yaw of the avatar's situated-heading, and front-to-back movements adjust the pitch of the avatar's head-pose. Notice that here a 2-DoF relative translational input is mapped to control two relative angular adjustments. The same methods of setting a CD ratio and varying the CD ratio in a rate dependent manner can also be applied to controlling the yaw and pitch of the viewpoint. Although a mouse could be used as an open loop control over distance (or angle) the remapping of linear distance covered based on velocity makes the mouse into a closed loop control.

Control over the pitch of the avatar's head-pose is treated separately from virtual locomotion, although it is as described below a key element of view control. On the other hand, control over the yaw of the situated-heading determines the heading and is thus an integral part of the virtual locomotion.

Keyboard and mouse controls are popular devices for controlling the avatar's viewpoint in first-person shooter video games because the precision of the mouse facilitates direct, precise, looking and aiming. The mouse is used to control the heading and elevation of the viewpoint. A set of four direction keys on the keyboard give the user a coarse form of directional control over the course-offset and rate control over the viewpoint's translation. Since a key press is mapped to a fixed velocity, the direction keys provide discrete rather than continuous control over the rate of displacement (the use taps the key slowly to move slowly and holds it down to move at the maximum velocity).

The keyboard and mouse control has similarities to a conventional gamepad control in that both use course-offset control mappings: turning the view changes the reference frame in which the direction of the course is interpreted. A fundamental difference is that the keyboard and mouse provides directional control over both steering and course-offset (versus the gamepad's rate control over steering and directional control over course-offset). The mouse's precise control of the viewpoint's yaw and pitch has made the keyboard and mouse popular for controlling first-person shooter games, since the user can quickly and accurately alter the view to steer the character and aim the character's weapon. Coordination between course and heading is still limited because they are controlled by different types of input devices (discrete keys versus continuous strokes). Keyboard and mouse controls are poorly suited for use with head-mounted displays because the user cannot see the keys of the keyboard.

Less Conventional Virtual Locomotion Controls

Another approach, designed to enhance a user's control over his viewpoint, is described in the patent: "Image Display Method and Apparatus with means for Yoking Viewpoint Orienting Muscles of a User" (U.S. Pat. No. 5,436,638 Bolas et al., issued Jul. 25, 1995). The control is intended to yoke the movement of a person's viewpoint orienting muscles to direct their viewpoint in VE. The user applies force to a spring centered input device specially designed to allow the user to apply forces from both sides of his body. These forces are yoked to provide a central measure of the user's muscle exertion. Up to 6-DoF of input can be expressed. The key idea behind this approach is that the movement of the viewpoint should react to the forces applied by the user—so as to turn or translate as the user's physical view would change if the forces were allowed to move the user's body rather than press against the device. To orient toward an area-of-interest on the left the user activates muscles that would be used to physically orient his body to the left and applies those forces to the device. The patent observed that: "The effect of virtual-motion of the viewpoint is compelling because the rate of motion increases with the forces applied." This is a good example of a viewpoint control designed to be simple and natural to use. Notice, however, that even an advanced design like this one still relies on rate control to steer virtual motion. Thus ease of use is achieved at the cost of limiting the kinds of motion that can be easily executed and dependence on immediate visual feedback (closed loop control) to direct motion.

Another class of motion controls were developed to more closely simulate natural locomotion by having the user gesture with the legs to indicate the direction, rate, and extent with which virtual steps are taken. Such systems track the motion of the legs and other body segments in real time, and map localized leg movements into translational motion. Such a control allows a person to stand and walk in place to control the movement of their avatar's viewpoint through VE, and is described in U.S. Pat. No. 6,646,643, James N. Templeman, issued Nov. 11, 2003 (hereinafter "Templeman"). The range of motion is expressed by stepping to: advance, move obliquely, turn, move in a bladed posture (as when holding a rifle), and turret the upper body relative to the feet. People are proficient at combining these movements to perform complex maneuvers. A person's awareness of their dynamic posture and orientation in space facilitates this freedom of motion. This range of mobility is called upon to carry out the movements involved in infantry combat. The differences between motions expressed by leg-based gestural controls and motions expressed using vehicular and computer game input controls are presented.

BRIEF SUMMARY OF THE INVENTION

According to the invention, an apparatus for controlling the movements of a vehicle having on-board controls for independently controlling the course and heading of the vehicle in response to a remote operator's control and an on-board camera/video transmitter for recording and transmitting a video stream of the camera's view of the physical environment within which the vehicle is operating, includes a user input means, e.g. a gamepad having a first joystick and a second joystick and a plurality of outputs responsive to user-controlled movements of each joystick and user-controlled buttons; a processor including a control mapping algorithm and a remote vehicle controller, with the control mapping algorithm mapping the gamepad outputs to the remote-controlled vehicle course, heading, and displacement, the first joystick mapped to provide an open loop directional control over steering of the vehicle, and the second joystick mapped to provide an open loop directional control over offset of the vehicle. The configuration provides open-loop control over the vehicle course and heading. The remote vehicle controller sends commands to the on-board controls to direct the movement of the remote vehicle. A display, e.g. a computer desktop monitor display or a head mountable display, receives the video stream and displays the movement of the vehicle to the operator/user.

The remote control vehicle, e.g. a tank or armored personnel carrier, may include a turret, with the remote vehicle controller including control over the rotation of the turret while the processor includes control mapping the turret rotation of the remote vehicle as a directional open-loop heading control. Using a gamepad, a joystick, e.g. the second joystick, may be mapped to provide either a course-offset or a heading-offset. The vehicle may then move in accordance to a computed situated-heading and the head-pose. The invention may also include a video rendering system for providing a mono or stereo video image to a head-mountable display or a desk-top monitor display.

One joystick, e.g. the second joystick, may be mapped to provide a course-offset or alternatively to provide a heading-offset. A tracker may be attached to the gamepad to direct a head-pose of the vehicle as an open-loop control. Using a head mountable display, a tracker may be attached to it to direct a head-pose of the vehicle as an open-loop control. With this setup, the avatar can be programmed to move in accordance to a computed situated-heading and the head-pose. A video rendering system can provide a mono or stereo video image transmitted from a camera mounted on the vehicle to a head-mountable display, and/or to a desk-top monitor display. A pair of sliding foot pedals may be provided and mapped for open-loop translational control of a displacement of the vehicle. The movements of the vehicle may be depicted as three dimensional.

Alternate types of dual-axis directional control devices may be used in place of the joysticks for controlling the vehicle's course and heading. These include trackballs, touchpads, or computer mouse devices. A third directional input device, e.g. a third joystick, may be used to provide additional directional control over the avatar's course, heading or head-pose.

Unlike the conventional dual joystick gamepad that only provides a partial open-loop control over the course by means of a directionally controlled course-offset joystick (allowing a user to sense and direct the course by positioning the offset joystick without the need for additional sensory feedback, but only without operating a second steering joystick control) the invention enables complete open-loop control over both course and heading, thus providing complete directional control without the need for additional sensory feedback while allowing the use of both the offset joystick and the steering joystick.

The apparatus accordingly uses a new set of control mappings to transform the user's manipulation of the input control devices into the motion of the remotely operated vehicle to give the user a high degree of control over their motion. The invention applies a conventional dual joystick gamepad in a new way. A hallmark of the new control mappings, introduced by this invention, is the use of a joystick as a directional control over heading: the angular direction in which a joystick is pointed determines the rotation of the heading. This has the following advantages: (1) it controls heading in an open-loop manner, (2) it makes it easier to coordinate changes in heading with other directional controls, and (3) it has a number of other advantages that will be described below. The direction in which a joystick is pushed can be used to direct the heading and course together to provide directional control over steering. Directional control over heading can also be used to allow the offset JS to enter the heading-offset (the offset of the heading from the course).

This invention's novel application of heading-offset control to locomotion encourages users to more freely redirect their heading and look around as the vehicle moves through its environment. This freedom to redirect their heading while following a selected path is very important for tasks that involve searching while on the move, as required for actual combat or other military tactical situations. Adding directional control over heading-offset allows the user to directly feel the alignment-offset at all times. Heading-offset control also makes following a path more consistent, in the sense that the steering JS is always operated in the same way to follow the same path, irregardless of how the heading is redirected along the way (by the heading-offset JS).

The invention describes a variety of different control mappings. Directional control over heading and course allows steering, scanning, and oblique movement to be controlled in an open-loop manner. Certain control mappings provide advantages in applications that emphasize certain types of motion. A situation focusing on tactical vehicular movement would benefit from a control that gives good support for scanning movement, such as for scanning a turret of a tank or similar vehicle; whereas some other types of situations would benefit from a control that gives good support for oblique movement. Assigning a joystick to directionally control the heading-offset (the offset of the heading from the course) makes it much easier for the user to execute scanning motions, whereas alternatively assigning a joystick to directionally control the course-offset (the offset of the course from the heading) makes it much easier for the user to execute oblique motions.

Applying the steering joystick as a directional control rules out using one of the axes of this joystick to control the pitch (up-and-down tilt) of the vehicle's turret or the like, as is done in conventional gamepad control mappings. Another input control device is required to control the pitch. The preferred approach adopts a conventional means of control: The user wears a tracked head-mounted display and the 6-DoF pose of the user's head directs the vehicle's turret relative to the course, heading and displacement. Alternatives are available for use with fixed displays and/or tracking systems that register fewer DoF. For example, attaching a 2-DoF tracker on the gamepad for controlling pitch and roll allows the turret to be rotationally controlled in a completely open-loop manner Sliding foot pedals provide open-loop control over displacement, since the user is aware of the extent of successive motions of the pedals without the need of further visual or auditory feedback. The action of sliding the foot pedals back and forth corresponds to the reciprocal motion of swinging the feet and legs during natural human locomotion. This can be used to advantage by tying the vehicle motion to the specific motions of the foot pedals. If the user's right foot pushes forward and the course and heading are aligned then the right leg of the avatar can be shown moving forward. Pose adjustments of the avatar are made to deal with other alignments between the course and heading. The velocity of the pedal motion can be associated with raising the feet off the ground so that the feet are down when the pedals are stationary. This detailed correspondence between the movements of the user's legs and the avatar's legs gives the user a greater sense of expression, control, and identification with the motion of the avatar. It also allows a person to walk across virtual stepping-stones by carefully controlling the length of the virtual steps taken.

Providing directional control over both the steering and offset joysticks makes it easier to coordinate the directional aspects of motion they control. Having open-loop control over course, heading, displacement, and head-pose makes it easier to learn to coordinate the aspects of motion they control. This correspondence of the angular extent for course, heading, and head-pose, and of the translational extent for displacement makes the controls easier and more natural to use than other forms of virtual locomotion. The ability to control a wide range of natural motions in an easily coordinated manner sets this control mapping apart from other virtual locomotion control mappings.

This directional control approach can be used with a wide variety of different tracking and display systems. Different kinds of trackers providing different degrees-of-freedom can be attached at different sites to give the user control over the vehicle's turret. This invention also presents different ways of controlling the vehicle's displacement using either the conventional radial movement of a joystick as a rate control or sliding foot pedals as a positional control.

Other features, objects, and advantages of the present invention are stated in or apparent from detailed descriptions of presently preferred embodiments of the invention found herein below.

DETAILED DESCRIPTION OF THE INVENTION

Figure 1:
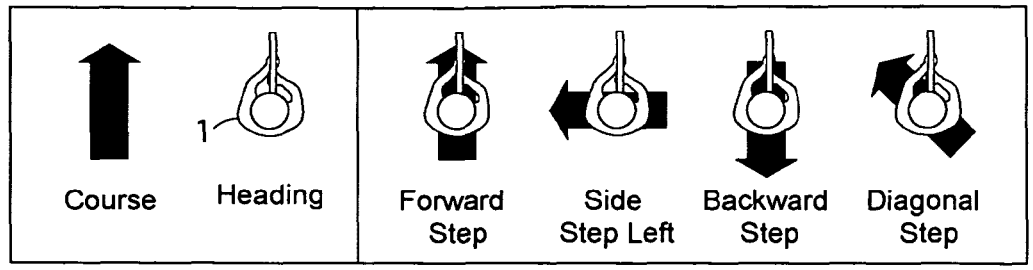
FIG. 1 illustrates basic terms of navigation applied to human locomotion.
Figure 2:
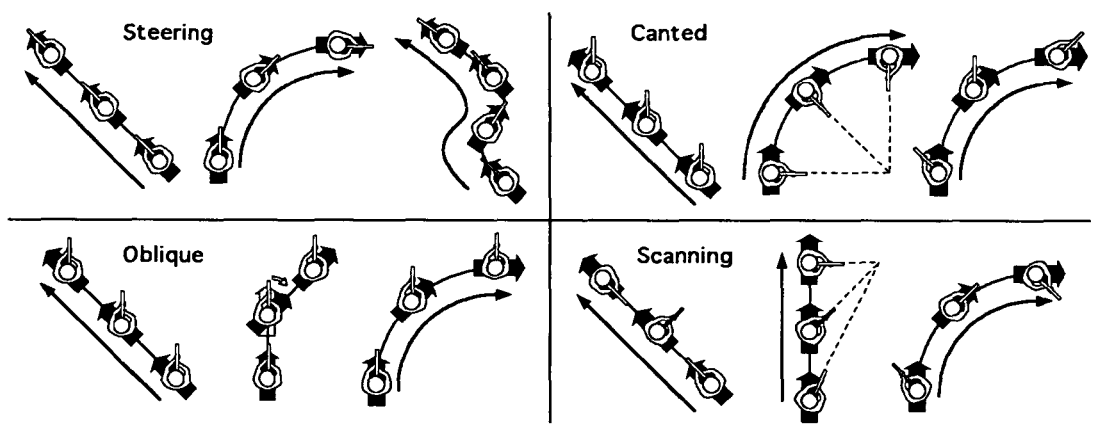
FIG. 2 illustrates the four classes of motion, giving examples of steering, canted, oblique, and scanning motion.
Figure 3:
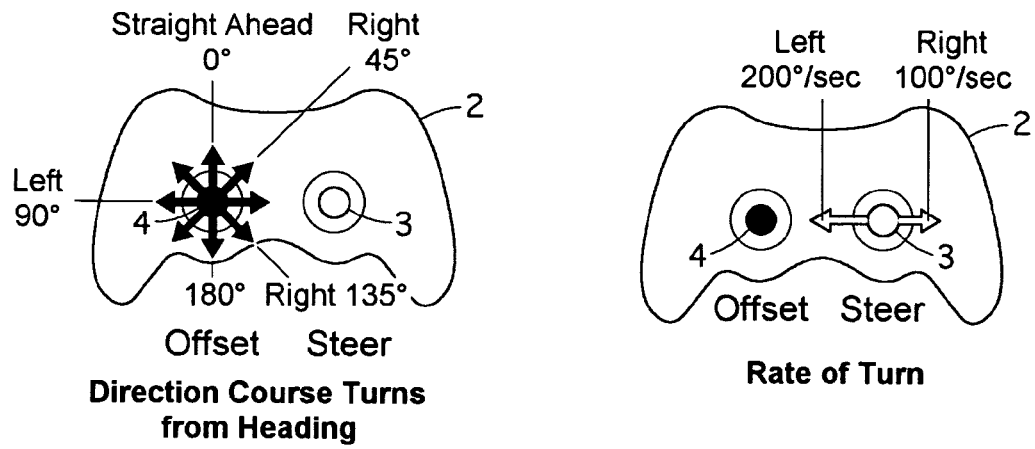
FIG. 3 illustrates a conventional joystick control mapping.
Figure 4:
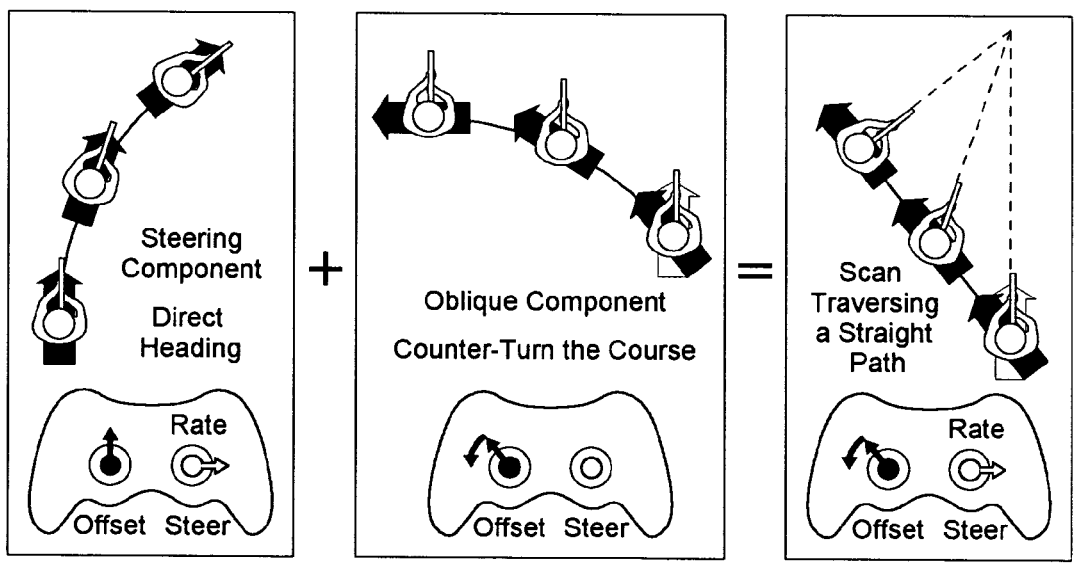
FIG. 4 illustrates a conventional joystick course-offset control mapping.

FIGS. 6, 7, 8, 9, 23, and 24 will now be referenced in which like numbers represent like elements, showing an apparatus 10 for interfacing the manipulation of input control devices as described below (30, 24, 16) operated by a user 12 to control the course, heading, displacement, and head-pose of an avatar 18 or a remotely operated vehicle 48. A view of the virtual environment 32 as seen from the avatar (or relative to the avatar if it's not a first person view), or of the real world environment 44 as seen from the remotely operated vehicle 48, is presented to the user using a display that may be either a stereo head-mounted display 28, or alternatively, a standard desktop screen-based display 29. The Z800 3DVisor, manufactured by eMagin, is a good example of a low cost head-mounted display for this purpose.

The apparatus 10 in one embodiment includes a dual-joystick gamepad 30, used for controlling the course and heading, such as the Sony Corp. DUALSHOCK®2Analog Controller. A gamepad adapter 14 interfaces the gamepad 30 outputs to the USB port of a digital computer 26, such as a processor or PC. A suitable such adapter 14 is the SmartJoy® Plus adapter, manufactured by SmartJoy®, which works well with the Sony DUALSHOCK®2Analog Controller. A 3-DoF tracker 24, that reports all three orientation angles (yaw, pitch, and roll), is attached to a head-mounted display 28 (FIG. 8), or alternatively, to the gamepad itself 30 (FIG. 9) when using a desktop screen-based display 29 as shown in FIG. 9. The 3-DoF tracker is used to control the rotational components of the head-pose of the avatar or remotely controlled vehicle. This allows the first-person view to rotate naturally with the yaw, pitch and roll of the head or gamepad. The InertiaCube3, manufactured by InterSense, is a good 3-DoF orientation tracker for this purpose. A coupled pair of sliding foot pedals 16 are used to control displacement. The CH USB Pro Rudder Pedals, manufactured by CH Products, works well for this purpose.

Figure 6:
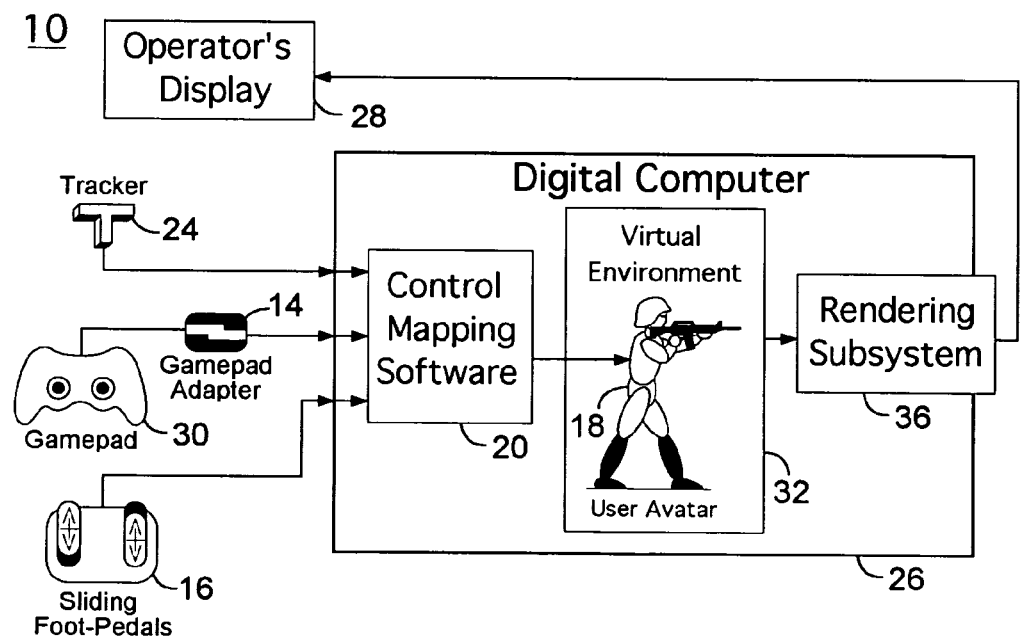
FIG. 6 is a schematic representation illustrating an open-loop control system for controlling the movement of an avatar in a virtual environment in accordance with the invention.

Referring now to FIG. 6, when controlling the movement of an avatar represented in a virtual environment (VE), the computer 26 receives input from the set of input control devices, updates a computational representation of the VE 32 including the user's avatar, and renders a view of the VE as seen from the avatar's perspective (or from a third person perspective). Control mapping software 20 applies the information from the input control devices to control the course, heading, displacement, and head-pose of the avatar. A rendering system 36, such as the Microsoft Direct3D component of the Microsoft DirectX application programming interface (API), converts the computational representation of the VE into a pair of stereo video images depicting the view of the VE as through the eyes of the avatar, including those parts of the avatar's body within its field-of-view. The stereo video drives the operator's head-mounted display ("HMD") 28.

Figure 7:
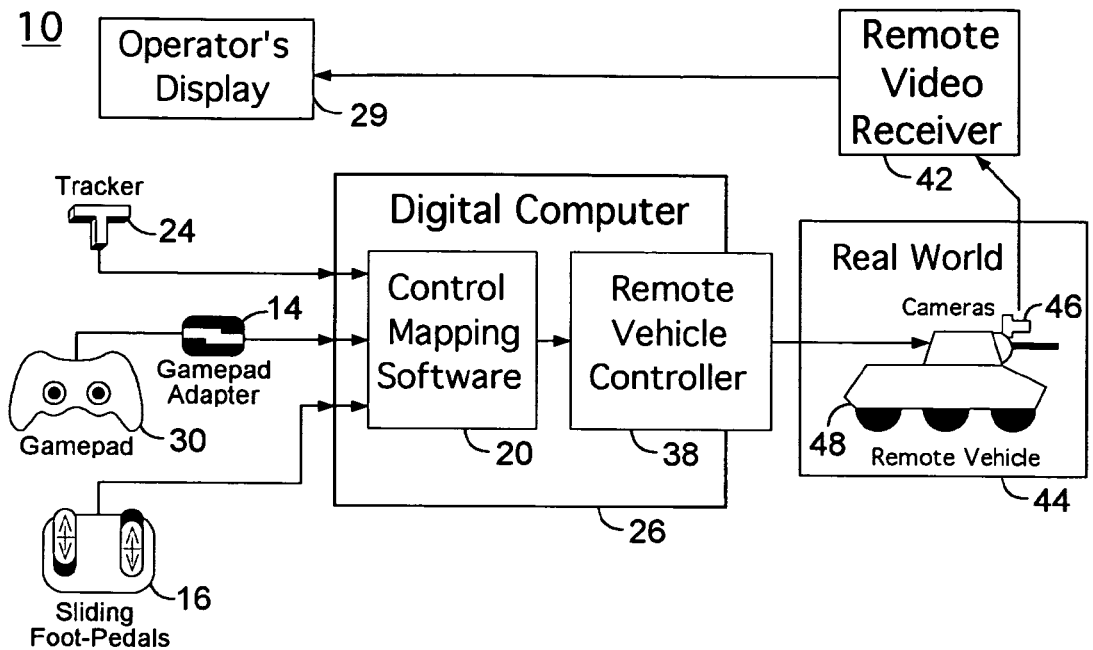
FIG. 7 is a schematic representation illustrating an open-loop control system for controlling the movement of a remotely operated vehicle in accordance with the invention.

As shown in FIGS. 6 and 7, inputs to the control mapping software 20 come from three devices: a hand-held dual joystick gamepad 30, sliding foot pedals 16, and a 3-DoF tracker 24 which is mounted on either an HMD 28 or the gamepad 30. These devices interface to the host computer 26 and present their inputs to the control mapping software 20 as follows.

The gamepad 30 is the primary input device for controlling course and heading (aspects of which are discussed in much greater detail below). It provides the axis inputs to the control mapping, from which the final course and heading derive, as well as other ancillary (e.g., button) inputs useful for allowing the user to interact with the virtual environment. From the standpoint of the locomotion control, the only requirement is that the gamepad 30 has two dual-axis joysticks 33 and 34 and that its data is accessible to the control mapping software via the Microsoft DirectInput component of the Microsoft DirectX API. A preferred configuration uses the Sony DUALSHOCK®2Analog Controller which plugs into the SmartJoy® Plus adapter which in turn plugs into any PC USB port. The SmartJoy® Plus adapter allows the Sony gamepad to communicate with the host computer 26 as a standard Human Interface Device (HID) using structured reports and a well-defined interface. No special driver is required, since Microsoft provides a class driver for managing HID devices on all current Windows platforms. Input from the HID-compliant gamepad is made available to the control mapping software running in user mode via the DirectInput API.

DirectInput presents the gamepad as a joystick-type device delivering several types of input, including a minimum of four axes (representing the left-right and forward-back movements of the two joysticks on the gamepad) and an array of buttons. Axis data is in arbitrary units determined by the range property of the axis, and is usually normalized by the application so that the input is zero when the stick is centered and plus/minus one when the stick is maximally deflected on either side. Button values represent (at a minimum) whether the corresponding physical button is up or down. In a preferred implementation the current state of the joystick is sampled at a rate of 120 times a second, which is slightly greater than the actual sampling rate of the data received via DirectInput.

The sliding foot-pedals 16 provide the input required for controlling displacement. Like the Sony gamepad, the CH USB Pro Rudder Pedals used in a preferred configuration is a USB HID device which is managed at the operating system level by the standard Microsoft HID class driver. It is presented to the control mapping software via DirectInput as a standard joystick-type device delivering three axes of input. In one preferred implementation only one of these axes is employed, representing the back and forth sliding motion of the coupled foot pedals. As with the input from the gamepad 30 joysticks, the axis data from the foot pedals 16 is normalized so that the input is zero when the pedals are in their centered neutral position and plus/minus one when the corresponding pedal is fully extended. The sampling rate for foot-pedal input is also preferably set at 120 samples per second.

The 3-DoF tracker used in a preferred configuration provides 3 angular inputs (yaw, pitch, and roll) for controlling the head-pose of the avatar or remote vehicle. We have found the InterSense InertiaCube3 to be a good orientation tracker for this purpose. It is a serial input device interfaced to the host computer via an optional USB adapter. Wireless operation is also available, although we find the standard tethered mode quite acceptable for use with a seated control interface. The rotational inputs are presented to the controlling mapping software via a vendor supplied API, packaged as a dynamic link library (DLL). The control mapping software receives the data at the full sampling rate of 180 samples per second.

Referring now to FIG. 7, when controlling the movement of a remotely operated vehicle, a digital computer 26 receives input from the set of input control devices, applies control mapping software 20 to control the course, heading, displacement, and head-pose (turret rotation) of the remote vehicle, and sends commands to direct the movement of the remote vehicle via a remote vehicle controller 38. The vehicle 48 then moves in its environment 44 responsive to the received stream of commands. One or more cameras, at least one of which is attached to the vehicle's rotating turret, capture real-time video of the surroundings. The remote video is transmitted to a remote video receiver 42 back at the operator's station and displayed on display 28 or 29.

The PackBot Explorer, manufactured by iRobot Corporation, is an example of a remotely operated turreted vehicle which may be used for this purpose. The vehicle's body uses a dual-tracked mobility system with articulated front flippers to turn in place and maneuver over all types of terrain. A mast-mounted surveillance camera features a continuous 360 degree pan and 270 degree tilt, allowing independent control over heading and 5-DoF (X, Y, Z, Yaw, Pitch) control of the viewpoint. Fully digital 2.4 GHz radio communications provides wireless control of the vehicle's course, heading, translation and view by the human operator, as well as the transmission of remote video captured by the surveillance camera for display back at the operator's station. The control mapping software 20 processes input received from the input control devices and sends commands via a vendor-supplied network API to the vendor's vehicle control software 38 running on-board the remote vehicle. Concurrently, remote video captured and transmitted from the vehicle's surveillance camera 46 is received at the operator's station 42 over the same vendor-supplied network API.

Figure 8:
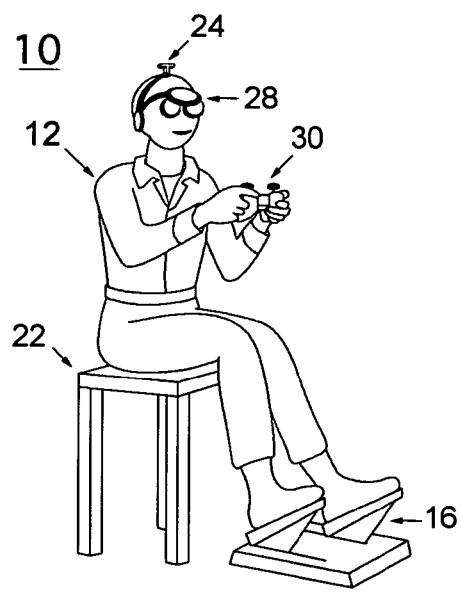
FIG. 8 is a schematic representation illustrating a user operating input control devices with a head mounted display in accordance with the invention.
Figure 9:
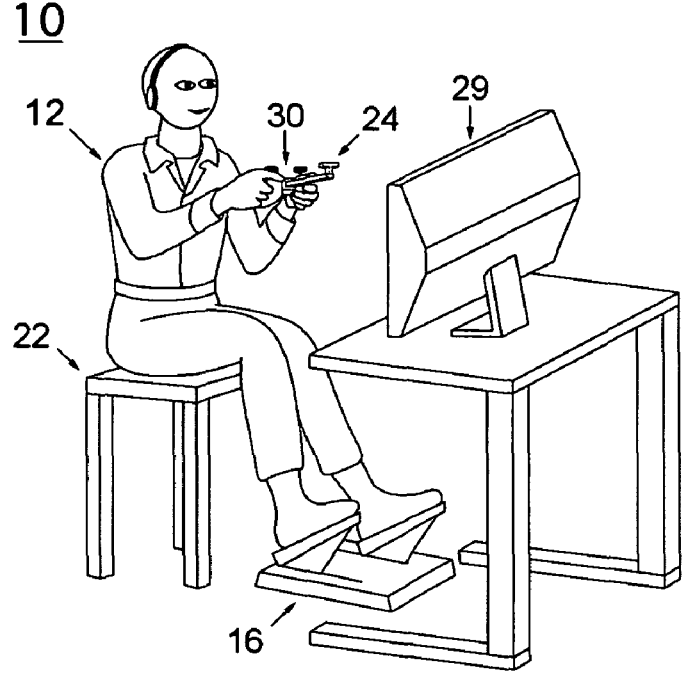
FIG. 9 is a schematic representation illustrating a user operating input control devices with a desktop display and with a tracker mounted on the gamepad in accordance with the invention.

Referring now to FIG. 8, a preferred embodiment of the invention uses a stereoscopic head-mounted display 28 to present the visual imagery to the user. The 3D tracker 24 is mounted to the head-mounted display 28 so that natural rotations of the head are used to control the view.

Referring again to FIG. 9, a desktop display 29, or another form of fixed screen display can be used as an alternate means of presenting stereoscopic (or monoscopic) visual imagery to the user. In this case, the tracker 24 is physically coupled to move with the gamepad 30 (as discussed above, being attached to the gamepad), so that the view is controlled by the pose of the gamepad. Tracker 24 in one embodiment is a 3-dof (or 6-dof) tracker that is integrated with the electronics of the gamepad, such that it reports its updates through the same channel as the other inputs from the gamepad 30.

Fully Directional Controls

We will now introduce two primary versions of the new control mappings. The first combines directional control over steering with conventional directional control over the course-offset to provide open loop control over navigation. The second combines directional control over steering with directional control over the heading-offset to provide an open loop navigational control with better support for scanning motion.

Fully Directional Course-Offset Control

Figure 10:
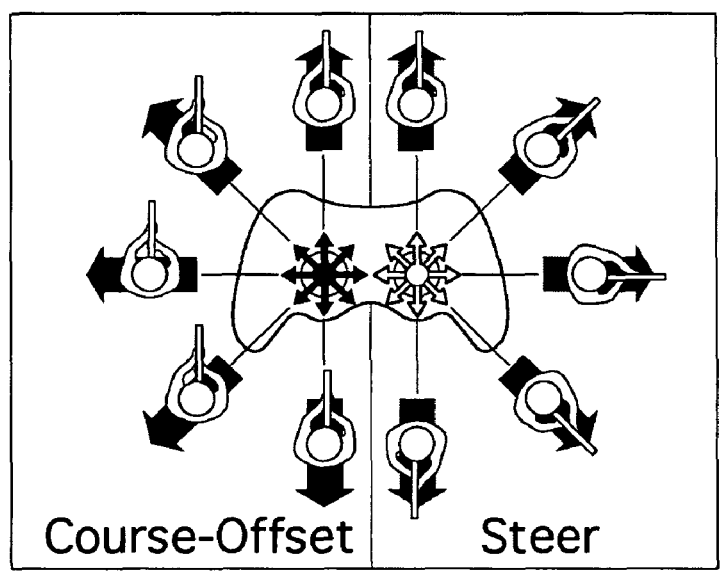
FIG. 10 is a schematic representation illustrating directional control for each of two joysticks together achieving open-loop control in accordance with the invention, when the second joystick controls the course-offset.

We now introduce a new way of applying the steering JS. The user pushes the steering joystick as shown in FIG. 10 using the right JS in the angular direction of the desired path of steered motion (turning the heading and course together). This provides directional control over steering, as opposed to the conventional rate controlled steering described above. This provides open loop control over steering because the user can enter the desired turn without having to rely on visual feedback from the display to know how far the steering turns. Even with closed eyes the user could still direct the avatar's path by any desired angle by pushing the JS in that direction. As with the conventional dual joystick control over virtual locomotion, the offset joystick shown in FIG. 10 using the left JS directs how far the course turns away from the heading.

Before either joystick is engaged, the course and heading are initially aligned in order to correspond to the direction in which the avatar's upper body faces. Once engaged, the angle of the steering joystick indicates and controls the direction of the heading relative to this initial direction. The angle of the offset joystick indicates and controls the offset of the course relative to the heading. The initial direction provides a fixed reference frame until the joysticks are released. The avatar's final heading becomes the initial direction for the next round of movements.

We call this a fully directional control mapping, because both the steering and offset joysticks express course and heading as the angular direction in which the joysticks are pointed. Directional control over both joysticks allows users to better coordinate the two because they are now directed in a similar way. Moreover, users continually feel the alignment of the two orientations and can move their avatar in an open loop manner. This is an ongoing sensation, just as with actual locomotion where people feel the alignment between their leg motion and the orientation of their upper body. We further categorize this as a fully directional course-offset control mapping. With this approach, both joysticks can turn the course, but the steering joystick also directs the heading.

Figure 11:
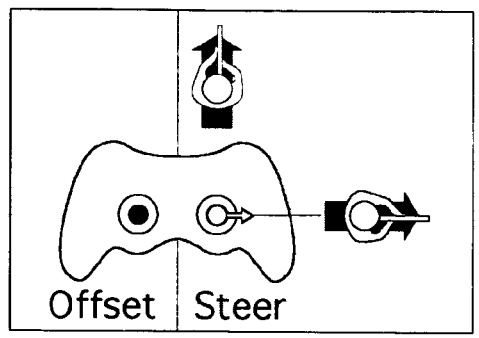
FIG. 11 is a schematic representation illustrating a direct angle turn executed with the steering joystick in accordance with the invention.
Figure 12:
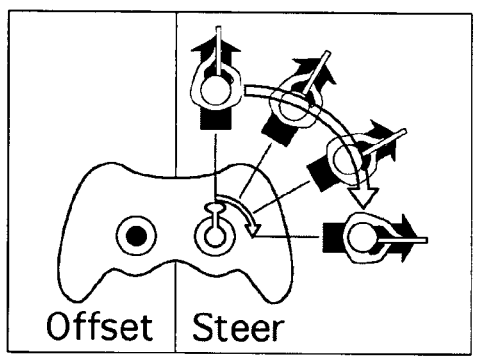
FIG. 12 illustrates a revolving turn executed with the steering joystick in accordance with the invention.

Directional control over the steering JS offers two ways of expressing a turn. Pushing a JS that was previously released in a new direction executes a direct angle turn in that direction, as illustrated in FIG. 11. Pushing the JS straight forward leaves the orientation unchanged. If the steering JS is held in a fixed direction, the course and heading remain steadily aligned in that direction. They do not continue turning as with a rate control JS held in place to the side. Repeatedly pushing the directionally controlled JS 90° to one side and releasing it performs a series of 90° turns to that side. The series of successive turns accumulate and the course and heading will come full circle after four 90° turns in the same direction. Once the steering JS is engaged (pushed in any direction) it can be revolved to execute a continuously changing revolving turn, as shown in FIG. 12. This does not necessitate the use of a special thumb-joystick that physically revolves on its axis. A conventional thumb-joystick is simply pushed along the circular rim surrounding it. Holding the JS on the rim steadies it and allows smoother, more precise manipulation. A smooth, even revolution of the joystick provides fine control over turning. The current heading is constantly updated to match the direction the JS points, relative to the initial heading. The course turns along with the heading. To return to the initial heading, the JS is simply revolved to point straight forward. Directional control over steering allows the user to directly sense the current direction of the heading by feeling where the JS is pointed.

A technique called panning is applied to limit the rate at which the heading rotates under directional control. In its raw form, without panning, an abrupt turn would instantaneously jump the heading to a new direction and a smooth turn would rotate the heading at the rate by which the joystick revolves. Panning is preferably set to a maximum rate commensurate with how fast a human can actually turn his or her body. Panning is applied to all open loop heading rotations resulting from input received from one or both directional controls (steering JS and/or the heading-offset JS described below). Conventional closed loop control over heading does not require panning since it is rate-based and the maximum rate of rotation is set by the control mapping, so that heading rotations are applied smoothly as the rate of turning is manually adjusted.

Directionally controlled heading rotations require panning since there is otherwise no inherent limit on the rate or acceleration of the generated rotations: a direct angle turn is expressed as soon as the thumb-joystick is moved outward from the center, and the thumb-joystick can revolve around its rim much faster than a human could physically turn his body. In the physical world, a person cannot instantaneously change his heading because this requires overcoming rotational inertia to align the body in a new direction. A change of heading takes place over time and is constrained by peak accelerations of body segments. Visual continuity is maintained due to the smoothness imposed by panning.

These constraints do not apply to course rotations in bipedal human locomotion, since a person can change his course instantaneously by simply starting to step in a new direction. Open loop, directionally controlled course rotations do not therefore require panning when applied to human locomotion. If the system, however, were being used for vehicular control (to control either a remotely operated turreted vehicle or a simulated turreted vehicle), then panning would be also required for the (directionally controlled) course, since a vehicle can only change its course at a limited rate of rotation.

Fully Directional Heading-Offset Control

Figure 13:
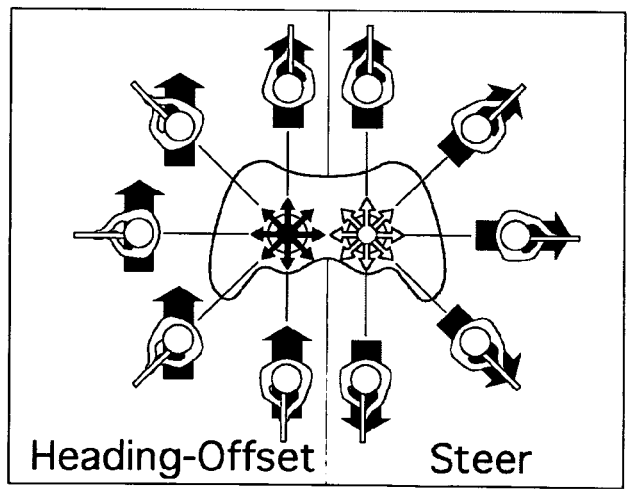
FIG. 13 illustrates directional control over the heading-offset in accordance with the invention.

Another fully directional approach applies the offset joystick in a different way. The steering JS operates as before with the fully directional course-offset control mapping: it specifies the direction of steered motion, as shown in FIG. 13 right control. This alternative approach then employs the offset joystick to turn the heading, offsetting it from the course, rather than offsetting the course from the heading. The offset joystick therefore controls how far the heading turns away from the course, as shown in FIG. 13, left control. We call this a fully directional heading-offset control mapping. When only the heading-offset joystick is operated, the heading therefore turns to follow the direction in which the joystick is pushed. When there is no displacement, the heading-offset joystick rotates the heading, turning the avatar in place. With this approach, both joysticks can turn the heading, but the steering JS also directs the course.

Steering is directed with respect to the environment in the same way regardless of how the heading is varied by the offset joystick. This provides consistency of use.

Before either joystick is engaged, both the course and heading initially correspond to the direction in which the avatar's upper body faces. Once engaged, the angle of the steering joystick indicates the direction of the course relative to this initial direction. The angle of the offset joystick indicates the offset of the heading relative to the course. The initial direction provides a fixed reference frame until the joysticks are released. The avatar's final heading becomes the initial direction for the next round of movements.

Panning is applied to limit the rate at which the heading rotates under directional control of both the steering and heading-offset joysticks.

We call this a fully directional control mapping, because both the steering and offset joysticks express course and heading as the angular direction in which the joysticks are pointed. Directional control over both joysticks allows users to better coordinate the two because they are directed in a similar way. Moreover, users continually feel the alignment of the two orientations and can move their avatar in an open loop manner. This is an ongoing sensation, just as with actual locomotion where people feel the alignment between their leg motion and the direction of their upper body.

Executing Different Classes of Motion with Fully Directional Controls

Figure 14:
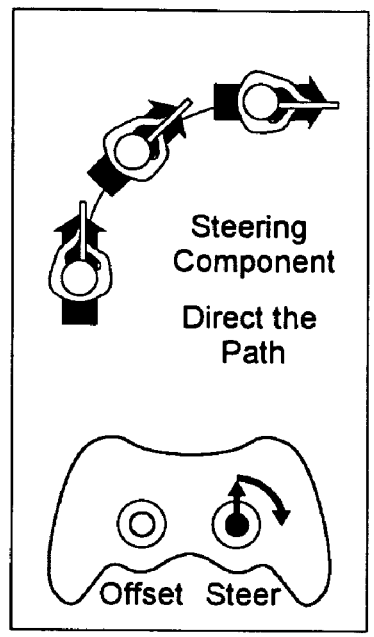
FIG. 14 illustrates fully-directional control over steering motion in accordance with the invention.
Figure 15:
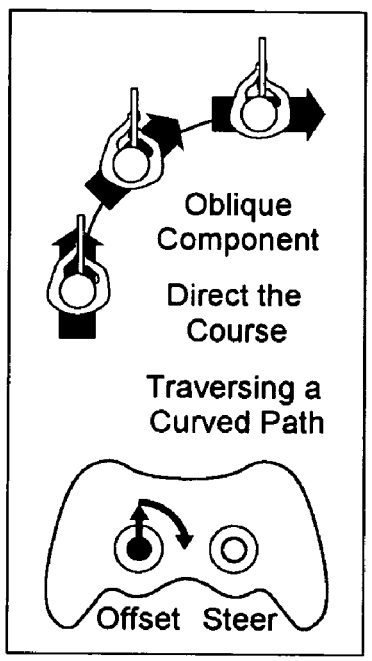
FIG. 15 illustrates course-offset control over oblique motion in accordance with the invention.
Figure 16:
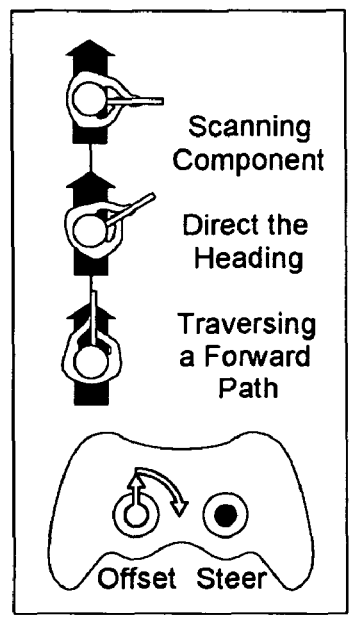
FIG. 16 illustrates heading-offset control over scanning motion in accordance with the invention.

We will now describe how different classes of motion are executed using the two different versions of fully directional control just described. Certain maneuvers are easier to make with course-offset control while others are easier with heading-offset control. A first cut at estimating the effort involved is simply whether the maneuver can be executed using one JS or requires the coordinated manipulation of both joysticks. Each form of control is limited to execute two kinds of motion applying the JS individually (since each control mapping employs two joysticks). When individually applied: the steering JS directs steering motion as shown in FIG. 14 in both course-offset and heading-offset control; the offset joystick directs oblique motion as shown in FIG. 15 in course-offset control; and the offset joystick directs scanning motion as shown in FIG. 16 in heading-offset control. All other motions are achieved by combining the steering and offset JS in different ways.

Figure 17:
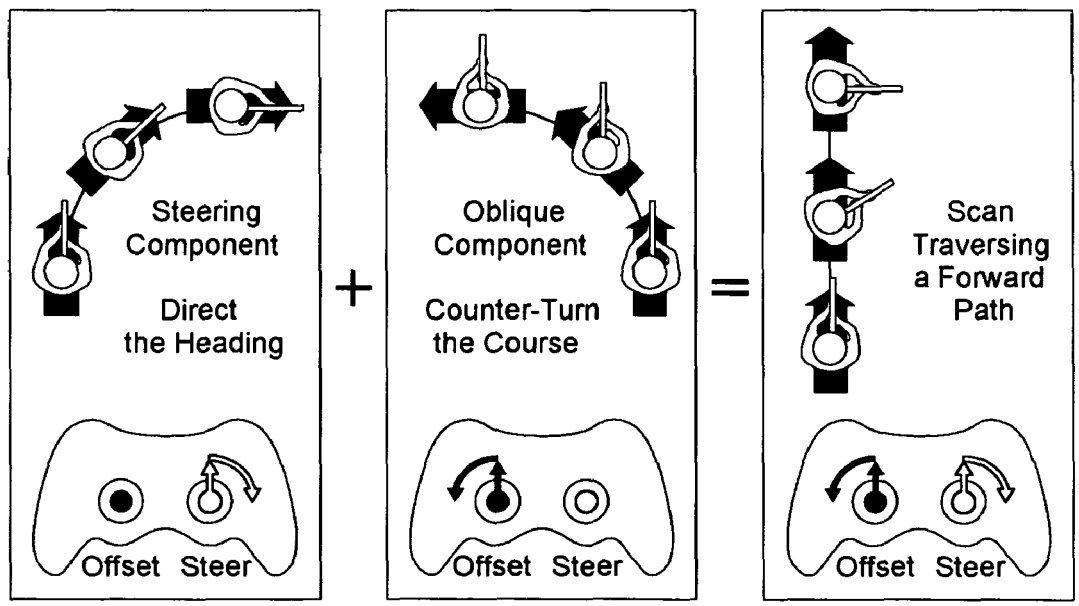
FIG. 17 illustrates course-offset control over scanning motion in accordance with the invention.

With course-offset control, scanning while maintaining a forward course requires the use of both joysticks. Since neither of the joysticks exclusively turns the heading, extra work is required to turn the heading without altering the course. The steering joystick is turned to direct the heading while the offset joystick must be counterturned to maintain the course as shown in FIG. 17. Counterturns can be executed smoothly by revolving both joysticks by an equal amount in opposite directions (a revolving counterturn), or abruptly by pushing them in opposite directions, symmetrically about the median plane of the gamepad (a direct angle counterturn). This can be done without visual feedback and maintains the open loop nature of the control.

Figure 18:
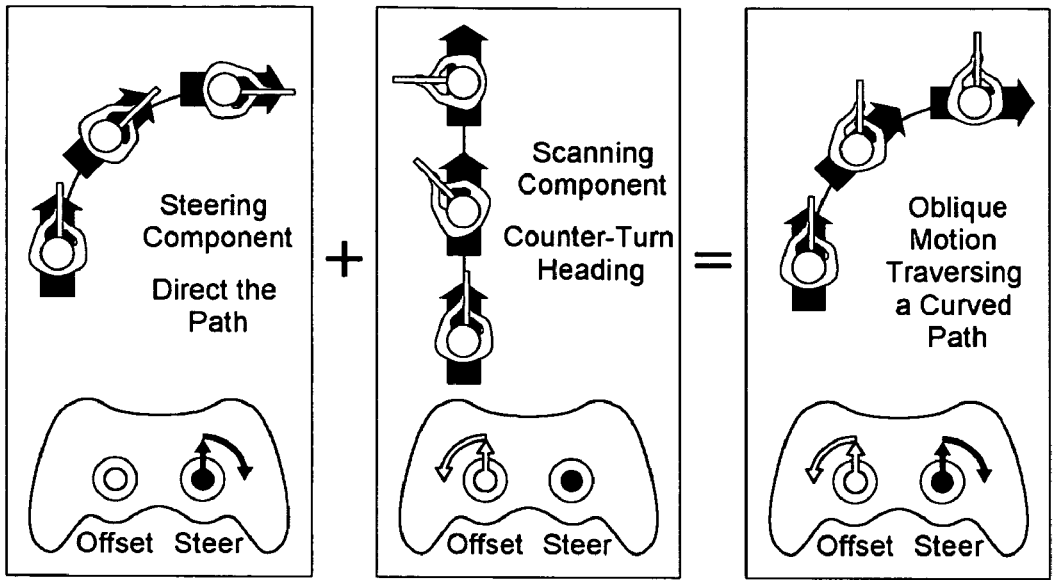
FIG. 18 illustrates heading-offset control over oblique motion in accordance with the invention.

Likewise, with heading-offset control, moving obliquely requires extra work to maintain a forward heading. Here the course must be turned without altering the heading. The steering joystick is turned to direct the course while the offset joystick is counterturned to maintain the heading as shown in FIG. 18. On balance, oblique motion is easier to execute with the course-offset control, and scanning motion is easier to execute with the heading-offset control.

Certain motions are performed in a distinctive manner using fully directional controls. Side and back stepping are good examples of this for heading-offset control. To sidestep to the right without changing heading, the steering JS is pushed to the right while the offset JS is pushed to the left (effecting a counter-turn of the heading). An immediate backstep without changing heading is executed by pulling both joysticks straight back at the same time. (Such distinctive actions are easy to perform from a neutral position, with the joysticks released or pushed forward. It is harder to execute such a motion when one or both of the joysticks are already turned at an arbitrary angle.)

It is worth noting that heading-offset control can only effectively be used to execute oblique motions if both joysticks are under directional control. Turning two directional JS by equal amounts in opposite directions ensures a balanced counterturn. It is especially difficult to balance turning when one JS is controlled by rate and the other by direction, since they respond so differently and the rate controlled JS provides no indication of the extent of a turn based on its position. (It is also difficult to execute oblique motions using a fully rate-based heading-offset control mapping; an example of this is the dual joystick control of turreted vehicles described in an earlier section.) A rate-based version of course-offset control, such as the conventional dual joystick gamepad control mapping, exhibits an analogous weakness in controlling scanning motion.

Targeted canted motion is performed by turning the heading towards the target with the steering JS while the offset JS is held in a fixed offset direction. This applies to course-offset and heading-offset control alike. The main difference between the two control mappings is in the transition from steering motion to targeted canted motion. It is easier to transition to targeted canted motion using course-offset when the target is in front of you, since the initial oblique motion (e.g., sidestep) is made with just the course-offset JS, altering the course while continuing to face the target. Likewise, it is easier to transition to targeted canted motion using heading-offset when the target is off to the side, since the initial turn towards the target is made with just the heading-offset JS, maintaining the course while continuing to face the target. For each of these transitions, the alternate control mapping would require an initial counterturn.

The course-offset and heading-offset control mappings are duals of each other: the operations used in one to achieve an effect in terms of course can be applied to the other to achieve an effect in terms of heading. There is however an inherent asymmetry in the way they interact with the translational and rotational components of the avatar's situated-heading that produces differences in the utility of the two forms of fully directional control. Course-offset control favors tactics which alter the path taken while maintaining the heading (oblique motion), while heading-offset control favors tactics which alter the heading while maintaining the path (scanning motion). Both control mappings work equally well for directing steering and canted motion.

Scanning While Moving Along a Curved Path

The differences between course-offset control and heading-offset control show up most clearly when scanning while traversing a curved path. This is the only class of motion where course and heading both turn, and turn by different amounts. Because course and heading vary independently, greater coordination is involved in manipulating the two joysticks to produce the desired motion.

Figure 19:
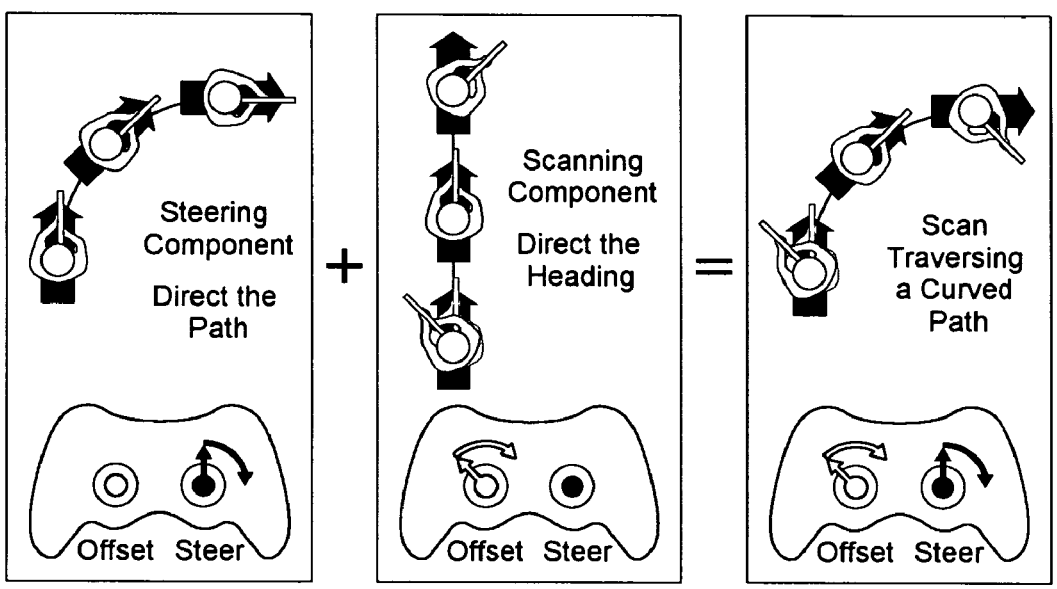
FIG. 19 illustrates heading-offset control over scanning while traversing a curved path

With heading-offset control, heading is redundantly controlled using both joysticks, with the offset joystick directing only the heading as shown in FIG. 19. This provides the freedom to independently redirect the heading while traversing any selected path. Although scanning while traversing a curved path can be difficult even in physical locomotion, this complex type of virtual motion is far easier to control using a heading-offset control mapping.

Figure 20:
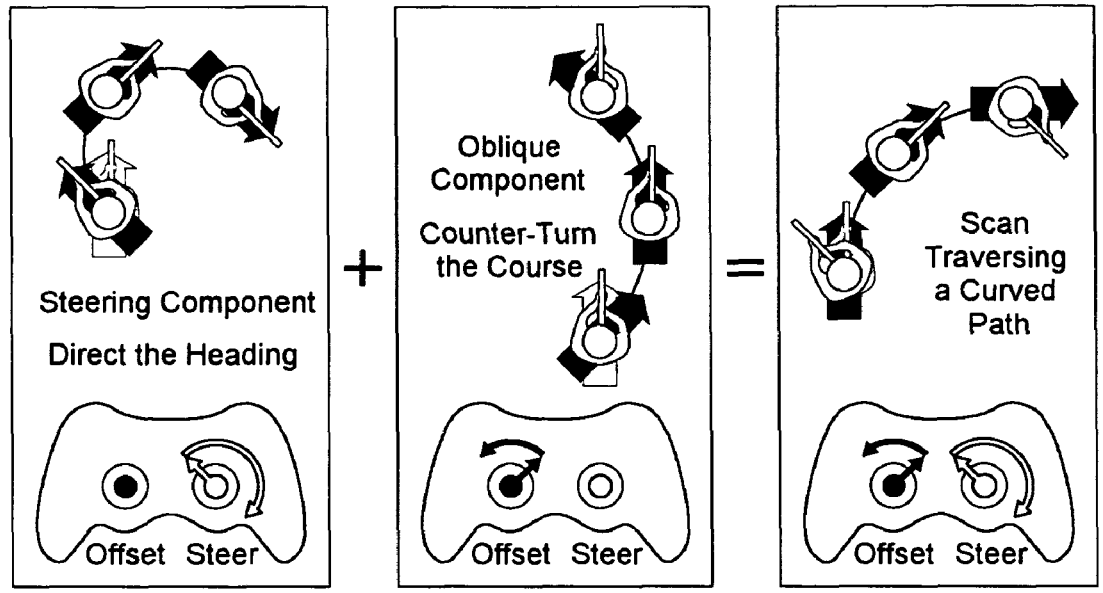
FIG. 20 illustrates course-offset control over scanning while traversing a curved path in accordance with the invention.

With course-offset control, on the other hand, only the steering JS controls heading, and it directs heading and course together as shown in FIG. 20. Turning the heading to face in a new direction also redirects the course. Although that coupling effect is useful for controlling targeted canted motion, it can only be overridden by counterturning the offset JS, otherwise it spills over to translate the avatar in an unintended direction. This makes it more difficult to direct the course while varying the heading to scan the environment. With course-offset control, it is difficult to remain aware of unintended course changes due to turning the steering JS. This requires applying the offset JS to compensate for unintended changes while at the same time intentionally directing the course to follow an arbitrary path.

Sensing Alignment of the Course and Heading

Heading-offset control and course-offset control are two forms of fully directional coupled control: one directional JS (the steering JS) turns both course and heading together, and the other directional JS (the offset JS) turns either course or heading an additional amount (relative to the orientation directed by the first JS). Fully directional coupled control has an important open loop advantage: the user is able to sense the alignment of the course and heading at all times. The direction the offset JS points when engaged indicates the alignment offset independent of the direction the steering JS is pointing. For example, when the offset JS is pushed to the left in course-offset control, the user knows the course is rotated 90 degrees to the left of the heading and that his avatar is sidestepping (or about to side-step) to the left. In a heading-offset control mapping, the left-pointing offset JS tells the user that the heading is rotated 90 degrees to the left of the course and that his avatar is side-stepping (or about to side-step) to the right. In particular, when the offset JS is either released or pushed forward, the user knows the course and heading are co-aligned and that his avatar is facing in the direction of his current or intended path. This applies to both course-offset and heading-offset directional control. This ability of the user to sense the alignment of the course and heading is open loop in that it does not require visual cues from the optic flow of the surrounding scene or the motion of the avatar's legs.

Figure 21:
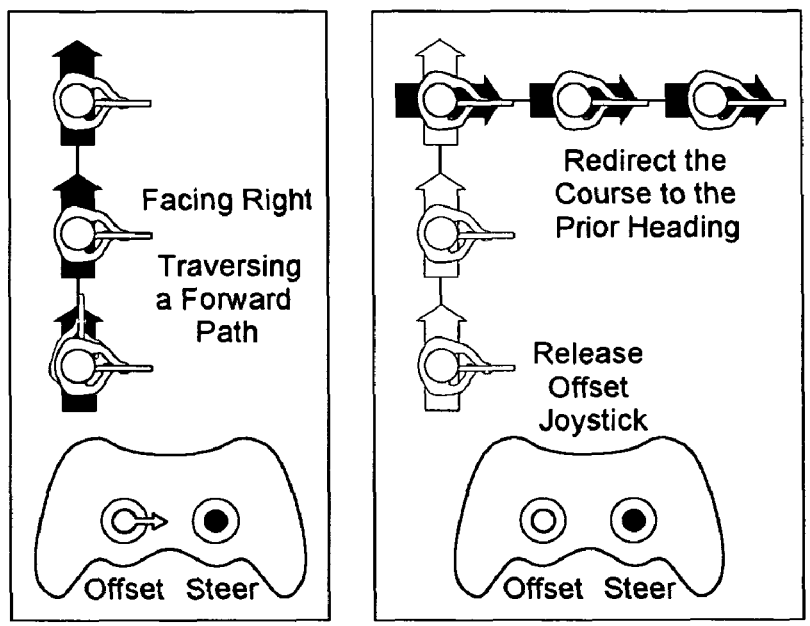
FIG. 21 illustrates realigning the course to the heading upon release of the heading joystick with heading-offset control in accordance with the invention.

When implementing a fully directional coupled control, the course and heading should be automatically realigned upon release of the offset JS. This ensures that the open loop nature of the control with respect to alignment will be maintained. There are two ways to effect this alignment: either by aligning the course to the heading, or by aligning the heading to the course. The favored approach is to align the course to the heading in order to preserve stability of the view upon completion of control actions. (Aligning the heading to the course on release of the offset JS would introduce a panning of the heading when the offset JS is released at an offset angle, turning the avatar to face the direction of the current course.) In the case of heading-offset control, automatic alignment of the course to the heading gives the user the option of either releasing the offset JS at an offset angle to redirect the course in the direction of the current heading as shown in FIG. 21, or returning the offset JS to a straight-ahead position before releasing to maintain the current course.

Special Assists for Simplifying Coordinated Manipulations

With our fully directional control mappings, to perform certain kinds of motion requires the coordinated manipulation of both joysticks. With heading-offset control, maintaining the heading while following a path (oblique motion) requires counterturning the heading offset JS as the steering JS turns the course. With course-offset control, maintaining the course while scanning requires counterturning the course offset JS as the steering JS turns the heading. Such manipulations take some practice to perfect and can be difficult for novice users. Also, there are times when it is convenient or necessary to perform a particular operation that normally requires two JS with only one JS (such as when one thumb is busy manipulating another control). There are several button-activated functions which can be applied (to vary the operation of the control mappings introduced in this invention) that simplify some types of coordinated manipulation by modifying the normal behavior of the particular control mapping.

Auto-Counterturn Button

To avoid having to manually counterturn the two JS to scan with course-offset control or move obliquely with heading-offset control, a button can be pressed to invoke an auto-counterturn function which allows the desired motion to be performed using a single JS.

While the auto-counterturn button is pressed, the offset orientation automatically counterturns in response to steering rotations directed by the steering JS. Auto-counterturning with heading-offset control causes the steering JS to control oblique motion, while auto-counterturning with course-offset control causes the steering JS to control scanning motion. In each case, the offset JS functions as usual (controlling scanning motion with heading-offset control and oblique motion with course-offset control). Thus, auto-counterturning allows the user to control with a single JS (the steering JS) a particular kind of motion which would otherwise require a coordinated movement of the two JS in concert.

A limitation of the auto-counterturn approach is that it causes the offset JS to go out of alignment, in the sense that when the offset JS is pushed straight forward after auto-counterturning the course and heading are no longer guaranteed to be aligned with each other. Thus the ability to sense the alignment-offset by feel is lost, and with it the open loop control over alignment available before the auto-counterturn was invoked.

Offset-Swap Button

Another function which can be assigned to a button press swaps the type of offset rotation applied by the offset JS. While the offset-swap button is pressed, a heading-offset JS temporarily controls the course-offset, or a course-offset JS temporarily controls the heading-offset. Like the auto-counterturn button, this has the advantage of reducing the number of JS counterturn manipulations required to perform common types of motion, but in a different way.

With a heading-offset control mapping, pressing and holding the offset-swap button causes the offset JS to control oblique motion instead of the normal scanning motion, without having to counterturn the two JS. With a course-offset control mapping, pressing and holding the offset-swap button causes the offset JS to control scanning motion instead of the normal oblique motion, again without having to counterturn the two JS. In both cases, the steering JS controls steering motion as usual. For some situations, coordinating a button press with turning a JS may be more convenient than counterturning two JS to perform the desired motion.

A limitation of the offset-swap approach is that it causes the offset JS to go out of alignment if it is pressed when the offset JS is engaged. The angular direction of the course-offset is equal and opposite to that of the heading-offset. Changing the interpretation of the joystick's function in midstream results in JS turns, occurring after pressing the offset-swap button, being applied as relative changes to the alignment-offset. Thus the ability to sense the alignment-offset by feel is lost, and with it the open loop control over alignment available before the offset-swap was invoked.

Uncoupled Control Mappings

Up until now we have been focusing on various types of coupled control mappings for controlling the locomotion of a virtual avatar or remote vehicle. Coupled control provides a means of turning the course and heading together (via a 2-Dof joystick), making it easy to perform steering motion along a path. We have sub-classified coupled control as either heading-offset control or course-offset control, whereby a second control device (e.g., another 2-DoF joystick) turns the heading-offset or course-offset, respectively. Conventional control of a virtual avatar, using either a dual-joystick gamepad or the mouse and keyboard, is a type of coupled course-offset control which is partially rate-based (and thus closed loop). We gave an example of a hybrid control mapping for turreted vehicles in simulation games which is a closed loop, coupled fully rate-based form of heading-offset control. Our invention describes a pair of open loop, coupled fully directional control mappings (a course-offset control and a heading-offset control) which demonstrate superior advantages for controlling both virtual avatars and remote vehicles.

Figure 22:
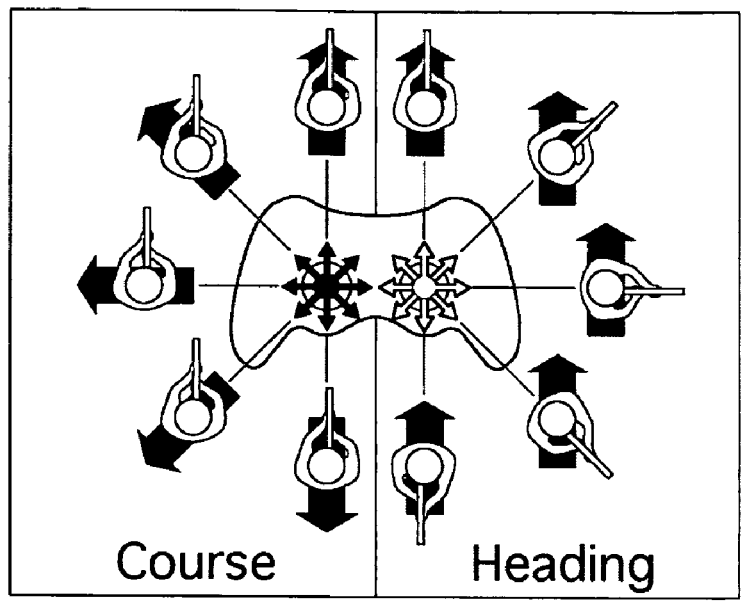
FIG. 22 is a schematic representation illustrating directional control for each of two joysticks together achieving open-loop control using a fully uncoupled control mapping in accordance with the invention.

Controls used for virtual locomotion may be generalized to encompass a family of controls which span the gamut from fully coupled to fully uncoupled. A fully coupled control always turns the course and heading together (e.g., using a conventional 2-DoF joystick or wheel to steer). A fully uncoupled control would always turn the course and heading independently as shown in FIG. 22. Although we categorize our fully directional open loop controls and most convention controls as coupled control mappings, they are actually partially uncoupled in the sense that the offset control device (e.g., second JS) turns just the heading-offset or the course-offset. When a control is fully uncoupled, the joystick that turns the course by itself is called the course JS and the joystick that turns the heading by itself is called the heading JS.

There are many different ways to partially uncouple control. Given a dual JS gamepad, here are just a few possibilities: (1) Each JS turns both course and heading (i.e., steers) when it is singly active, but when the JS are co-active, one turns just the course and the other turns just the heading; (2) One JS always steers, while the other JS turns just the course (oblique motion) when it is singly active and just the heading (scanning motion) when it is co-active; (3) One JS steers when executing revolving turns but turns just the heading (or course) while executing direct angle turns, while the other JS always turns just the course (or heading).

While most of these forms of uncoupled control are ill-suited for directing the movement of a virtual avatar, the design space is large and some control mappings may prove quite useful for other applications, such as those requiring some forms of robotic control, or for specialized applications of virtual locomotion.

When a control mapping is uncoupled, a pair of coupling functions, assigned to button presses, can be useful for times when it is necessary or convenient to turn the course and heading together. While the heading-steer button is pressed, the heading JS becomes a steering JS and turns the course with the heading. While the course-steer button is pressed, the course JS becomes a steering JS and turns the heading with the course. If both of these buttons are held down, the last button pressed overrides the other.

An issue that arises with uncoupled control is when and how to realign the course and heading. This may be done implicitly, in response to a specified control transition, or explicitly (e.g., under button control). When aligning the course and heading implicitly, it is generally more helpful to align the course to the heading rather than the heading to the course, since this preserves the stability of the view and prevents panning of the heading as the controlled entity turns to face the direction of the current course. Implicit alignment of the course to the heading may be triggered whenever the course JS becomes inactive (whether or not the heading JS is active), or it may be triggered whenever both JS become inactive.

Explicit alignment of course and heading allows the user more intentional control over alignment when using uncoupled control. For example, clicking a course alignment button causes an immediate alignment of the course to the heading at any time, even when one or both JS is active. Similarly, clicking a heading alignment button would perform an immediate alignment of the heading to the course.

Comparing Pointman to the Conventional Gamepad

For the sake of the following discussion, the present invention is interchangeably referred to as "Pointman". A review of the literature on infantry tactics shows that scanning, looking over top of the rifle for threats while moving, is a defining element of tactical movement. But scanning is difficult with the vast majority of device-based virtual locomotion controls which use course-offset control. These include conventional gamepad controls, mouse-keyboard interfaces, and interfaces in which a joystick is mounted on a rifle prop to control the course while the user turns wearing a head-mounted display. In all these interfaces, turning the heading (via steering) redirects the course, disrupting the user's ability to follow a path while scanning. As a result, it becomes difficult to execute realistic tactical maneuvers.

In contrast, Pointman adopts a heading-offset control mapping to allow the user to easily scan to look side-to-side or fixate on a target while traversing a path in the environment, making it easier to execute the recommended tactical movements. The steering joystick is manipulated in the same way to traverse a given path no matter how the offset joystick alters the heading. This independence offers additional advantages. The constancy makes it easier to follow paths regardless of how users direct their heading, and it reinforces the open loop approach because fewer control variables need to be sensed and acted upon. With practice, users can execute a variety of real world tactical infantry movements in a simulator using either a head-mounted or fixed display.

Solving the tactical movement problem led to a control that allows users to freely scan their heading without redirecting the course. This result can benefit any application where it is useful to freely look around while continuing to move along a path.

Using Separate Inputs to Further Control the View

Conventional closed loop rate control over steering requires only 1-DoF input from a joystick, leaving the joystick's other axis of control free. This axis of the JS is usually allocated to control the pitch (elevation) of the avatar's head-pose. Open loop directional control over steering uses both of the 2-DoF provided by the joystick on a gamepad, so that another input is required to control pitch.

The preferred method for controlling the head-pose is to attach a 3-DoF tracker to a head-mounted display (HMD) that reports all three viewing angles (yaw, pitch, and roll). In this case, the head-pose rotates naturally as the head is turned.

Head-Mounted Displays

If a tracked HMD is used, then the pitch of the HMD is linked to control the pitch component of the avatar's head-pose: the user directs his avatar to look up and down by tilting his head up and down. Likewise, the yaw and roll of the HMD is linked to control the yaw and roll of the avatar's head-pose. The user can direct his avatar to glance to the right or tilt his head to the left by performing the same actions with his own head. These rotational offsets are combined with the situated-heading directed by the virtual locomotion control to yield the avatar's viewpoint in the virtual world. The user's perspective of the situated-heading corresponds to the first-person view seen by the user as he sits upright and faces straight ahead.

An HMD may be tracked with up to 6-DoF: three translational coordinates (X, Y, Z) and three rotational angles (Yaw, Pitch, Roll). If all 6-DoF are available, they can be linked to control the translational as well as the rotational components of the avatar's head-pose. For example, the user can direct his avatar to lean forward to duck or look out of a window by tilting forward in his seat. Even if fewer DoF are available, as would be the case if an inertial tracker was used to detect the head's orientation (Yaw, Pitch, Roll), then it would still be useful to apply this input to direct the user's view. 3-DoF tracking is described in the preferred configuration because, at the present time, precise 6-DoF trackers are considerably more expensive than precise 3-Dof trackers, and it is desirable to provide a low cost means of simulating virtual locomotion.

Using a Head-Mounted Display to Present the Scene

The new fully directional virtual locomotion controls are fully compatible with tracked head-mounted displays (HMDs). The tracked HMD provides an additional level of control over one's view, and thus allows the control axis typically used by conventional gamepads to control the pitch of the head-pose to be used for other purposes (e.g., directional control over steering.) in the invention. Use of a tracked HMD requires a refinement in the description of how the virtual locomotion controls the view, as follows.

As discussed above, the viewpoint combines the 4-DoF situated-heading directed by the virtual locomotion control with the 6-DoF head-pose directed by a tracked HMD to specify the position and orientation of the avatar's head (or vehicle's turret) in VE. The user views the virtual world through the eyes of the avatar (or vehicle's cameras). The virtual scene is rendered onto one or more physical displays presented to the user.

The orientation of the situated-heading, set using the virtual locomotion control, is specified by a single rotation about the vertical axis (yaw). With a tracked HMD, the user can freely change his view of the VE by simply turning his head. The direction of view, set in alignment with the HMD, rotates about all three axes (yaw, pitch, roll.)

This additional freedom in directing the view relates to the changes in view executed via the virtual locomotion control as follows. Virtual locomotion controls the situated-heading. The direction of the situated-heading defines the straight-ahead view: the direction in VE when looking straight ahead. The view of a tracked HMD turns with respect to the situated-heading. Turning the head alters the direction of view in VE, relative to this straight ahead direction, by the same angle and in the same direction by which the head is turned from physically facing straight ahead. The turning view seen in the tracked HMD operates within the context of the overall alignment performed via virtual locomotion. Turning the HMD does not change the straight-ahead view (the direction of the heading) or redirect the course. (This can also be thought as using the virtual locomotion control to turn the scene about the user while the user can freely turn his head to look around the scene.)

The user needs to be aware of when his head (and body) is aligned with the straight-ahead view to use the locomotion control effectively, since that is the direction his avatar will move when the steering JS is directed straight ahead (and the offset JS is disengaged or also pointing forward). This alignment is initially set (or reset) via a boresighting operation, usually under button control. The locomotion control works best when the user senses his physical alignment and can readily acquire a centered alignment, as when seated in a fixed chair. If the user is free to turn his body, as when standing or seated on a swivel chair, then the straight-ahead view is simply oriented in one particular direction (i.e., fixed with respect to a compass heading). (Alternatively, the turning (yaw) of the user's body can also be tracked and its rotation can be factored out of the change in the head-pose or into the change of the course and heading, as desired.)

Using Separate Inputs to Control Displacement

In conventional gamepad control mappings, one of the joysticks used to control steering or offset are overloaded to also control displacement along the course: the deflection of the joystick along one or both axes sets the rate of displacement. If the control is fully directional (such as the course-offset joystick of a conventional dual-joystick gamepad), this corresponds to the R-component of the dual-axis input. If the control is rate-based (such as the single joystick axis used to steer a turreted vehicle), the other axis of that joystick is used to set the rate of displacement. Both cases provide closed loop control over displacement.

Similarly, in the practice of the invention, displacement can be overloaded onto the steering or offset inputs of the new fully directional control mappings. With course-offset control controlling the rate of displacement using the offset JS is preferred so that the user can turn the avatar in place (by engaging the steering JS with the offset JS inactive). With heading-offset control using the steering JS to control the rate of displacement is preferred so that the user does not have to stop translating to release the offset JS; the user can turn the avatar in place by engaging the offset JS with the steering JS inactive. (In both cases, the JS most directly tied to controlling the course is assigned to control the rate of displacement.)

Overloading either the steering or offset JS to control displacement has several disadvantages that reduce the utility of the new fully directional virtual locomotion controls. Control over displacement remains closed loop, compromising the open loop nature of the new control mapping. Also, it is much easier to control and coordinate the joysticks in a directional manner when they are deflected all the way out to the rim and revolved. It is requires more skill to finely control both the amount of deflection and the direction of a single 2-DoF joystick, and is even more difficult to precisely coordinate directional control over two joysticks when the deflection of one of them is also being used to control displacement.

For these reasons, a better approach offloads control over displacement to a separate input control device, preferably a foot-controlled device to take advantage of the natural correspondence of using the legs to walk (just as using a tracked HMD to control the head-pose naturally corresponds with turning the head to look around). One example of a foot-activated control device is a single foot pedal used to control the rate of displacement. Another is a sliding foot-pedal input device which provides control over displacement by mimicking a person's foot motion while walking. This offers positional control and preserves the open loop control, making it resemble natural human locomotion in terms affording open loop control.

Sliding Foot Pedal Input Control Device

A sliding foot pedal device which works well as an input control for displacement has two pedals which are mechanically coupled so that one goes forward as the other goes back. The absolute displacement of the coupled pedals is scaled and applied to displace the avatar along the course. This is done on a moment by moment basis and can be started or stopped at any instant. The motion of the sliding foot pedals can also be linked to animating the swinging motion of the avatar's legs as the feet move apart and back together during a step.

The coupled sliding foot pedals provide a high degree of correspondence with human walking and running. They allow the user to control both the length and cadence of his steps, as well as the nature of the step (pace) being taken. For example, half-steps can be taken by sliding the same foot forward and back to the center so that it always leads the other foot, whereas full-steps are taken by sliding the feet symmetrically back and forth.

Control over the length and cadence of stepping affords a high degree of precision and range of control over displacement. The cadence (stepping frequency) can be used to scale the length of steps taken, just as a person's steps get progressively longer as his pace quickens from a walk to a run, such as is described in Inman et al., "Human Walking", Williams & Wilkins, Baltimore, 1981. (Conventional rate-based control over displacement requires one or more additional control devices (e.g., buttons) to manually scale up or down the avatar's translational velocity to allow sprinting or creeping.)

The coupled foot pedals provide a single DoF of control. A pair of uncoupled sliding foot pedals could also be used. Although the 2-DoF input they provide would still be mapped to control displacement, a 1-DoF variable, the additional DoF would provide greater freedom in expressing different ways of moving the avatar's legs.

Using Separate Inputs to Further Control the View

When a stationary display (or an array of displays) is used to present the view of the virtual world, an alternative to tracking the user's head must be used for controlling the avatar's head-pose. This is because the user must keep his gaze fixed on the display in front of him, preventing him from turning his head to direct his view relative to the straight-ahead view defined by the situated-heading.

When using a fixed display instead of an HMD to present the scene, attaching or embedding a tracker in the gamepad is preferred. This tracker allows the user to rotate the avatar's head-pose (directing his view relative to the straight-ahead view) by pitching, turning and tilting the gamepad with his hands. The virtual scene is rendered onto one or more physical displays presented to the user. When a single stationary display is used, the view direction in VE is aligned with the center of the display screen. When an array of stationary displays is used the view direction is aligned near the center of the array.

The ability to manipulate the pitch of the gamepad is especially useful for controlling the pitch component of the head-pose, to make up for using both axes of the steering JS as a directional control.

Alternatively, a low-end approach is to allocate a pair of buttons on a gamepad to provide rate control over raising and lowering the pitch. Using buttons to control the view is generally undesirable since they lack precision (even over axis inputs), can be clumsy to use, and degrade the open loop nature of the viewing control.

Tracking Elements Mounted on a Gamepad

The use of gamepads with embedded tilt sensors to rotate the head-pose is not new. In particular, gamepads with internal 2-DoF sensors for controlling pitch and roll have been marketed for use in popular video games (usually of the flight simulation genre). This is a low cost approach appropriate for consumer oriented game control. An example of a manually held tilt sensitive non-joystick control box is described in U.S. Pat. No. 5,059,958, Jacobs, et al., issued Oct. 22, 1991. Early tilt sensors often only sensed pitch and roll over a limited range of angles and were therefore used to control the rate at which the view was pitched (and possibly rolled). Modern orientation tracking sensors can register a full range of orientations and thus allow a one-to-one mapping of the input angle to the head-pose to be applied. The addition of tracking sensors extends the range of control offered by gamepads with paired JS, and, most importantly, completes the open loop view control mechanism described in this document. Other tracking technology may be used to track the gamepad with 3-DoF to cover all three rotation angles, or even in 6-DoF to allow the head-pose to be translated over short distances by translating the gamepad.

Use of these Controls when a Third-Person View is Presented

The new fully directional control mappings can also be used to control the course, heading, and displacement of an avatar (or vehicle) viewed from a third-person perspective. Control of characters from an external vantage point is widely used in many popular action video games.

Alternate Input Control Devices

Figure 23:
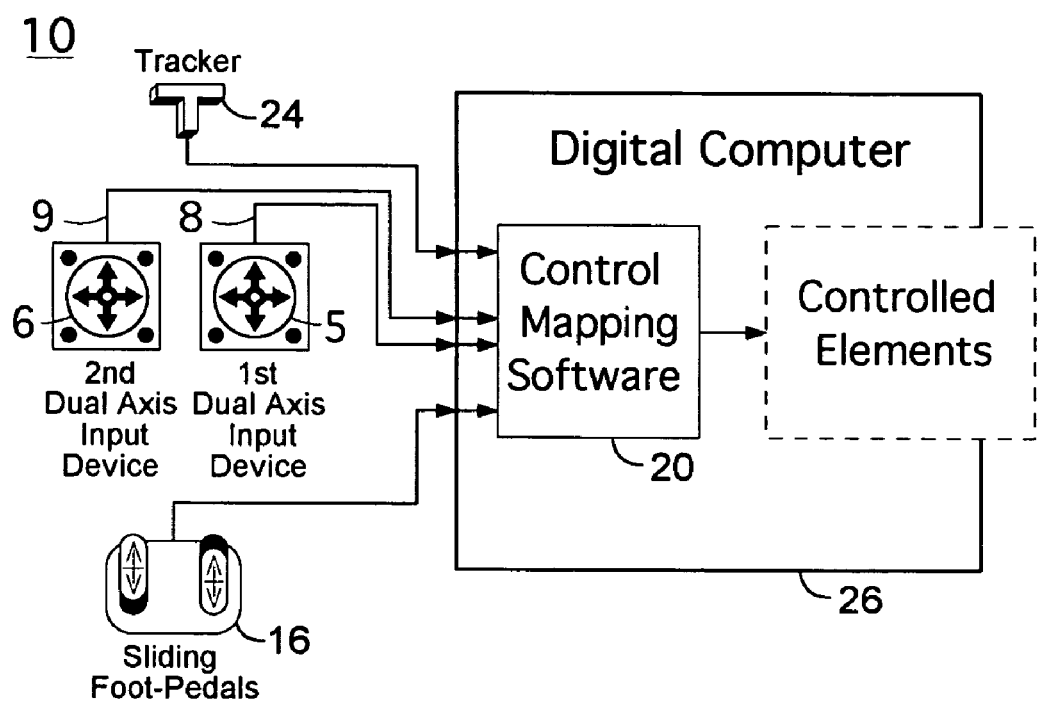
FIG. 23 is a schematic representation illustrating a motion control system in which a pair of dual axis input control devices, a tracker, and an optional set of sliding foot pedals provide input to a control mapping in accordance with the invention.

Although a pair of thumb joysticks on a gamepad have been used to illustrate the use of a pair of dual axis input control devices, other dual axis input control devices could be substituted for the thumb joysticks. Full size (hand filling) joysticks, track balls, touch-pads, and mice can be used to provide directional input to the control mapping. FIG. 23 shows two such generic dual axis input control devices 5 and 6 interfaced to the open loop control mapping software 20. As with each joystick of gamepad 30, dual axis input device 5 and dual axis input device 6 each have outputs 8 and 9, respectively, responsive to an operator control that are input to processor 26 and mapped by control mapping software 20 as described above. Although FIGS. 22 and 23 illustrate, as its plurality of outputs, outputs 8 and 9, it is not intended that these depict just two output signals overall, as it should be understood that gamepad 30 and other input devices such as 5 and 6 typically include multiple outputs (within the "plurality of outputs" terminology as used herein), not just two discrete outputs, controlled by the operator's use of button controls and the like which is also within the scope of the invention, and as is well understood in the art.

Mice, trackballs, and touch-pads are 2-DoF relative positional input devices. Mice, trackballs, and touch-pads are inherently open loop controls when the control-to-display (CD) ratio is held constant. Unlike a JS, their input does not have an origin (absolute zero coordinate location), a radius, an angle of departure from straight ahead of the origin (theta), or a rim. Such devices are readily associated with controlling course since they directly encode a path's trajectory by reporting a series of 2-DoF (X-Y) displacements. If the trajectory of input displacements curves, then the course turns. Thus it is straight forward to substitute one of these positional input devices for the course JS while retaining a heading JS. (Such a setup no longer makes use of conventional gamepads with paired JS.)

One can uncouple the direction from the translation that these devices inherently express by discarding the distance information and using only the direction of successive X-Y displacements to control orientation. Such an approach can be used to control the turning of the heading or course. Thus a matched set of two such positional devices could be used to control course, displacement, and heading using steering and offset controls analogous to those described for a dual-joystick gamepad.

Use of a Third Directional Control Device

Figure 24:
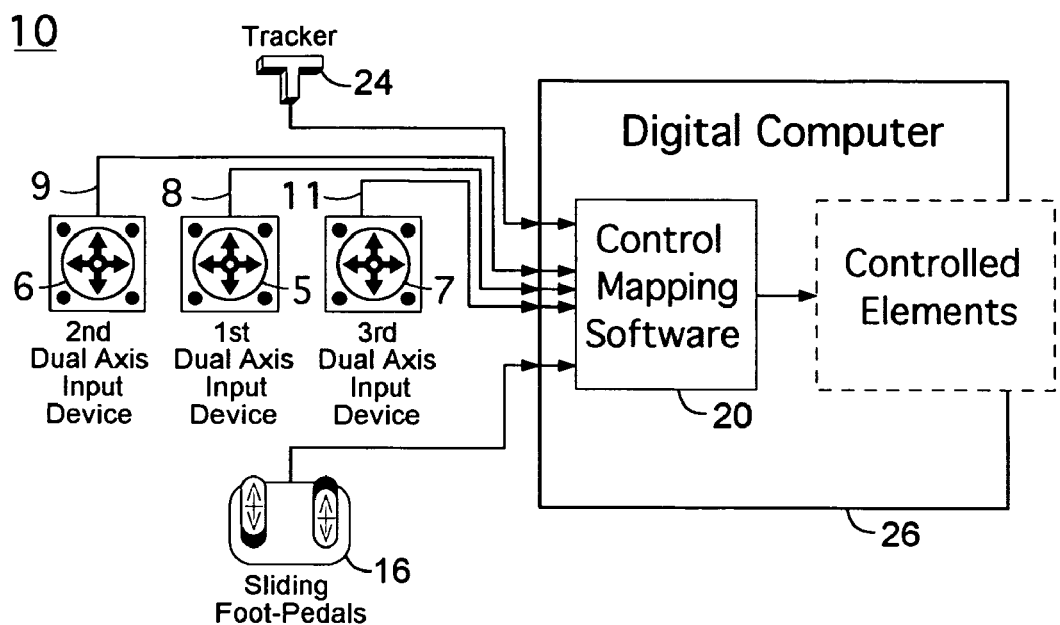
FIG. 24 is a schematic representation illustrating a motion control system in which three dual axis input control devices, a tracker, and an optional set of sliding foot pedals provide input to a control mapping in accordance with the invention.

If a third directional device is available as shown in FIG. 24 as input device 7 (e.g., a third JS) with output 11, this may be allocated as a second offset JS. This provides a fully directional coupled control with (1) a steering JS to turn both course and heading, (2) a course-offset JS to turn the course, and (3) a heading-offset JS to turn the heading. The disadvantage of this approach is that if the user wants to control more than two directional controls with his thumbs he will have to move his thumbs back and forth between controls to access them.

One or more single-axis controls (e.g., the individual axes of a third JS or a gamepad-mounted slider) may also be used to control the yaw, pitch, or roll of the head-pose in an open-loop manner. These can mapped as positional controls since the rotations are limited to how far a person can turn, pitch or tilt their head in either direction (along the applicable axis). This could be a lower-cost alternative to tracking (the HMD or gamepad) for controlling the view, although access to thumbs and fingers already used for manipulating other input controls remains a problem.

Control of Locomotion in Three Dimensions

A pair of 2-DoF input control devices are fine for controlling movement and orientation over a 2-dimensional surface, as is required for simulating human locomotion or piloting ground vehicles. Input control devices that provide higher DoF can be used to control the movement and orientation of an entity as it turns and 'flies' (or 'swims') about freely in three-dimensions. For example, a control device called a SpaceBall® (made by 3dconnexion, a Logitech company) is a 6-DoF input device that can be operated by a single hand. A pair of such devices could be used to control a generalized 3D course (x, y, z) and heading (yaw, pitch, roll) using the open loop control approach described in this document. Such a setup could be used to perform surveillance with advanced air and undersea vehicles or to guide laparoscopic equipment while directing the view in any desired direction.

Advantages of Fully Open Loop Control Over Virtual Locomotion

Conventional gamepads provide partial open loop control over only one aspect of virtual locomotion: oblique movements directed by the course-offset JS. All other kinds of motion, including steering, canted and scanning motion, are performed using closed loop control because turning (via steering) and displacement are rate-controlled. By providing directional control over turning (via the steering and heading-offset JS) and displacement (via the coupled sliding foot pedals), this invention enables all aspects of locomotion (over a surface) to be controlled in an open loop manner.

Substituting fully open loop control over what was before primarily closed loop control has many advantages. Joysticks are well suited for performing open loop control over turning. The rim surrounding the joystick serves as a rest to steady the JS. This assists in making fine directional adjustments. It also guides the JS in evenly sweeping out larger turns.

More Direct Control Over Turning

Open loop control over turning with a JS is more direct than a rate controlled approach: Direction is specified by a spatially directed input. Open loop control over turning makes use of the user's natural ability to point the JS in the desired direction. The user's accuracy of pointing the JS with his thumb is mapped into his ability to direct his movement in VE.

Closed loop rate control over turning depends on the user's ability to control the precise timing of angular velocity changes, made in relation to what is seen on the display. Open loop controls are more temporally immediate because the user does not have to wait to perceive computer generated feedback to know when the desired angle has been entered correctly.

Greater Sense of Direction

The user feels the direction of the JS, and does not have to infer changes in direction from what is seen on the display. As the user revolves the JS, he feels its direction change and thus constantly senses the turning of the course and heading. The current direction of the JS expresses the result of successive adjustments. This contributes to the user's sense of orientation in the short-term.

These virtual locomotion controls are intended to simulate a person's natural ability to walk, run, turn, and move in different directions. Open loop control over course and heading help substitute for a person's bodily awareness of how he is oriented and how the various parts of the body move in relation to each other. For example, if a person turns their hips 30° to the side it is easy to counterturn the head to keep facing in the original direction, because the person constantly senses the orientation of each and the degree of alignment between them. With these fully directional controls the user could turn 30° to one side by pointing the steering JS in that direction and counter-turn the heading-offset JS by the same amount to keep facing in the original direction. The user constantly feels the orientation of each JS and is aware of the relationship between them.

The coordination of a person's eye and head motion while viewing a scene is another example of natural open loop control: (1) People can fixate their eyes on a visual target while turning their head; their eyes reflexively counterturn to stay on target. (2) People can see a visual target in their peripheral vision and turn both their head and eyes in the same direction to line the eyes up on it. Here the head and eyes turn together, each contributing a part to the total required turn. This high level of coordination is accomplished by reflexes linking a person's kinesthetic and vestibular sense of head motion with kinesthetic sensing and control over the direction of the eyes.

People can learn to coordinate their eye and thumb movements. It is easy to point the JS and look in that direction or turn the JS and eyes by similar amounts in the same or opposite directions. One plans, executes, and senses the directing of the eyes, head, and JS in an open loop manner. Eye movements can coordinate with the movements of the user's avatar, because pointing the JS turns its situated-heading. The user initiates and continually directs the movement of his eyes and the first-person view. The eyes need not follow what is seen on the display; they can move in concert with turning the view. This allows the user to keep his eyes fixed on targets as he turns the view. It also allows the user to readily turn the view to center a visual target originally seen in the periphery, transforming visually sensed angles into turns executed via open loop control. When a head-mounted display is used, the same sort of open loop actions allow the user to coordinate the movement of his head with the controlled turning of the view.

Open loop control provides a greater sense of certainty about how far one has turned. If visual or auditory information is available to aid in judging how far one has turned, then open loop control provides additional sensory evidence to confirm and refine these judgments. Visually observing different forms of optic flow (outflow specifies approach, the center of outflow specifies the direction of locomotion, etc.) occurring in response to moving the JS, reinforces the user's sense of control over virtual movement.

Open loop control helps give people a better sense of the distances and angles relating objects as one moves with respect to them. A user moving through unfamiliar landscape will have to learn the bearings and distances between the visual landmarks before using them to orient (without using a map). The user can derive a better sense of his path through unknown terrain if he has an internal (i.e., open loop) sense of how far he turns and translates. The act of building up a sense of where one has traveled in this way is called path integration. Path integration helps people maintain their orientation when moving through unfamiliar terrain and it helps people more quickly and accurately learn the layout of new terrain by exploring it.

Less Dependence on Vision

Open loop control makes it possible to control the movements of one's avatar under (real or simulated) poor visibility conditions, including low-level illumination, total darkness, smoke, fog, and temporary blindness due to exposure to very bright light. It also helps when there are few directional cues in one's field of view, as when facing a large texture-less wall. Even under good visibility conditions, the visual feedback resulting from turning or translating may be ambiguous. Visual feedback associated with turning may be confused with translating to the side; in both cases the scene appears to shift across one's field-of-view.

Open loop control reduces the demands on visual perception. It makes it possible to execute actions when visual attention must be directed elsewhere. It allows users to focus on aspects of what they see, other than those required for locomotion. Visual perception may be better allocated to other tasks, such as visually searching for targets as one moves through hostile terrain.

Open loop control allows the user to retain control in spite of a certain amount of latency (the delay between when the user performs a control action and when the VE system displays the result of that action). If the JS of an open loop control is pointed in the right direction the view will soon come to rest in that direction, even if there is some latency in rendering the updated view, or even variable latency in updating the view. Timing is more critical for closed loop controls. Thus open loop controls provide greater tolerance of latency.

Coordination Between Matched Directional Locomotion Controls

When a pair of input control devices are used to control related elements (e.g., course and heading), matched directional control facilitates their coordination and makes it easier to manipulate them in concert to obtain the desired result.

It is easier to coordinate a pair of positional controls than to coordinate either a rate control with a positional control or two rate controls. It is difficult to coordinate a rate control with a positional control because spatial alignment and timing has an entirely different impact on each. It is difficult to coordinate two rate controls because the timing of their activation must be carefully matched and the extent of their deflection must be carefully balanced to obtain the desired composite result.

A 'matched pair' of directional controls facilitates varying course and heading in similar ways. This matching is achieved by (1) having the two input devices be physically similar to one another, (2) placing the two input devices symmetrically within the user's reach, and (3) having the two inputs mapped to a common coordinate system (i.e., with a common scale and alignment).

These qualities facilitate both static and dynamic coordination. Here we are considering control over the course and heading. Static coordination involves relating the direction of one JS to the other in terms of such things as offsets, bilateral symmetry, addition, or differencing. Dynamic coordination involves moving the two JS in concert with each other. This includes (1) bilaterally symmetrical operations: deflecting the two JS in equal amounts in opposite directions, (2) counterturning: revolving the two JS in unison, by equal amounts in opposite directions, and (3) maintaining a constant angular separation between them by revolving the two JS by equal amounts in the same direction.

Advantages of Fully Directional Coupled Control

When the user turns the heading using the gamepad controls, he receives no vestibular sense of turning. The new controls comprise several innovations to help compensate for this omission. First and foremost, they provide fully directional coupled control over course and heading: one directional JS (the steering JS) turns both course and heading together, and the other directional JS (the offset JS) turns either course or heading an additional amount. A coupled control applies one input device to turn the course and heading together (e.g., a steering JS).

Heading-offset control and course-offset control are the two forms of fully directional coupled control. With heading-offset control, the offset JS additionally turns the heading relative to the course. With course-offset control, the offset JS additionally turns the course relative to the heading. Both forms of coupled control make it particularly important for the user to be able to coordinate the two forms of turning required. Open loop directional control over both course and heading facilitates coordination by expressing direction in a common form.

With heading-offset control, turning the course (via the steering JS) has the secondary-effect of turning the heading. With course-offset control, turning the heading (via the steering JS) has the secondary-effect of turning the course. Both secondary-effects involve turning and so benefit from open loop coordination, which permits accurate counterturning, to counteract these effects. Counterturning is used to maintain the heading with a heading-offset control, and to maintain the course with a course-offset control.

With heading-offset control, oblique motions require moving the steering and offset JS in concert. Changing the course while maintaining the heading is executed by pushing the steering JS in the desired direction of motion and the offset JS in a bilaterally symmetrical direction (the mirror image taken across the front-to-back axis of the JS). To maintain the heading while following a curved path, the offset JS must counterturn with respect to the changing course directed by the steering JS.

With course-offset control, scanning motions require moving the steering and offset JS in concert. Changing the heading while maintaining the course is executed by pushing the steering JS in the desired direction of turn and the offset JS in a bilaterally symmetrical direction. To maintain the course while continuing to scan, the offset JS must counterturn with respect to the changing heading directed by the steering JS.

In both cases (performing oblique motions with heading-offset control and scanning motions with course-offset control), the use of directionally matched controls over steering and offset makes it much easier to execute the necessary counterturns.

Sense of Alignment Between Course and Heading

With both forms of directional alignment-offset controls, the user is able to sense the angular offset between the course and heading via the offset JS. The course and heading are always aligned when the offset JS is either disengaged or pushed straight ahead. Otherwise, their angular offset is the angle the offset JS directionally deviates from straight-ahead. With heading-offset control, this is the angle the heading deviates from the course. With course-offset control, this is the angle the course deviates from the heading.

Advantages of Heading-Offset Control

Fully directional heading-offset control has several additional advantages which enhance open loop control over navigation. Heading-offset control is especially well suited for improving the constancy involved in traversing a path because the control actions involved are independent of the heading and the alignment-offset as one moves along the path.

The primary advantage of heading-offset control is that it allows the user to freely turn the heading while maintaining (i.e., without interfering with) the course. It accomplishes this by using the steering JS to couple the heading and course so that they turn together, and then providing a second JS to allow additional turning of just the heading, relative to the path directed by the steering JS. This enables the user to execute tactical maneuvers like turret-ing the upper body (as a gun platform) to scan for targets while moving around corners or along a complex path through built-up terrain. In more pedestrian terms, the user can more readily scan to search for items of interest as he moves through a VE.

In the real world, people tend to direct their heading on an immediate basis: changing in response to immediate interests. The course is the direction of translation along a path and is thus an element of a larger trajectory swept out over time and space. It requires planning and commitment to execute a trajectory. Thus it is beneficial to allow the heading to be easily redirected without altering or interfering with the course.

With heading-offset control the course is controlled exclusively by one JS (the steering JS), while both JS can alter the heading. This is in contrast to course-offset control in which course is impacted by both JS and heading by only one JS.

The heading-offset approach has the advantage that a single JS directs the course. The rate and direction of turning the heading (via the offset JS) has no impact on the course or translational path of the viewpoint. Thus the control sequence used to move around a corner or along a curving path is always the same regardless of how the user turns the heading (via the offset JS) to vary the view. This makes it more consistent, and thus easier, to plan and execute course trajectories. This constancy provides more direct control of the path taken over a wide range of maneuvers, even when the heading varies in response to what is seen in the environment or to maintain a desired alignment. This constancy helps improve both learning and performance in using the control.

Greater Sense of Course Direction

With heading-offset control, the user feels the change in the direction of the course as the current direction of the steering JS. This direction is relative to that when the steering JS was last engaged, or when the offset JS was last released (since releasing the offset JS realigns the course to the heading, when automatic alignment of the heading to the course is in effect). With course-offset control, the direction of the course is less directly sensed since it results from the joint manipulation of both joysticks.

Advantages of Using Sliding Foot-Pedal Device to Control Displacement

Allocating control over translation to another input device frees the steering and offset JS to be used exclusively for entering directions. Use of a separate device allows the translation of the viewpoint to be controlled in either a closed or open loop manner. Given the advantages of open loop control stated above, an input device and control mapping that provides open loop control over translation is recommended. This suggests that a relative positional control be used. A foot operated device that allows the feet to move in a reciprocating manner, such as the sliding rudder foot pedals used in flight simulators or the foot pedals of a stationary bicycle, offloads the hands and applies the lower limbs in a fashion naturally associated with locomotion. The reciprocal motion of the feet relative to each other can be linked to drive the animation of the avatar's leg motions, so that the avatar's gait relates to the user's physical foot movements.

Using the motion of (coupled or uncoupled) sliding foot pedals to determine the motion and alignment of the avatar's legs provides an additional correspondence between the user's control actions and the avatar's response. This helps the user better identify with the avatar's movements. By controlling the timing, rate, and extent of the avatar's leg motion, the user has greater control over the precision of steps taken along the path, as well as the range of translational velocity, especially when cadence (stepping frequency) is used as a scaling factor for step length.

Advantages of Pointman for Tactical Infantry Simulation

We call the fully directional heading-offset control, with the course realigned to the heading upon release of the offset joystick, Pointman. It is one of the more generally useful directional heading controls described in this patent. Pointman allows users to scan their view to cover danger areas without disrupting their motion along a path. Few controls provide this ability, yet the majority of tactical infantry movements depend upon it. It permits individuals to control realistic tactical movements in virtual simulations. Since many of these tactical movements relate to how an individual operates as part of a larger team, this new locomotion control permits realistic small unit team tactics to be simulated.

This virtual locomotion control was motivated by an examination of the small unit infantry tactics employed in urban combat in general and building clearing operations in particular. We observed how experts perform tactical movements in the real world and using the Gaiter virtual locomotion control (described in Templeman) in simulation. We compared this with the way people control the movement of their avatars with the conventional gamepad and mouse-keyboard interfaces used in first-person shooter games, and observed different movement strategies being used.

Figure 25:
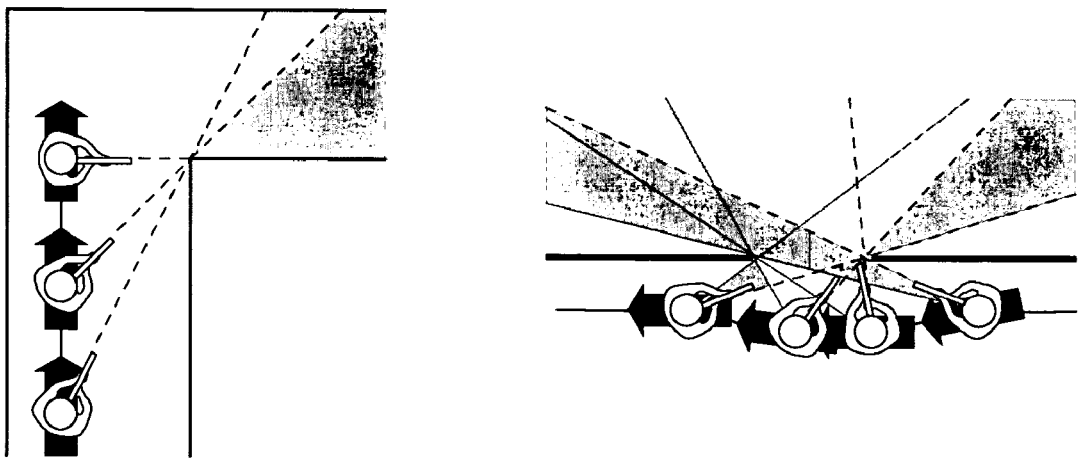
FIG. 25 illustrates (left side) turning the heading towards a corner while maintaining a straight course and (right side) pie-ing past an open doorway in accordance with the invention.

Tactical infantry movement involves keeping the rifle directed where you are looking while scanning for threats. "The purpose of any tactical maneuver is to allow your muzzle to cover the potential danger areas as you encounter them. Observe the three-eye principle. This means that your weapon must be oriented toward whatever it is your eyes are looking at. Wherever your eyes go, your weapon must also go. Keep the weapon in a ready position or 'hunting' attitude so that it does not obstruct your vision while you search" (Suarez, 1998). FIG. 25 illustrates two such tactical movements. Scanning is used to cover and clear danger areas, especially areas exposed as one moves around corners. In terms of perceiving the environment during locomotion, vistas open at the occluding edge of a corner as a person advances. In terms of infantry tactics, to 'pie' a corner one directs one's attention just past the corner's edge to look into the area incrementally disclosed by moving along a hallway, leading to a corner.

Scanning is also used to direct one's view and rifle from side-to-side to cover one's sector of responsibility when moving as part of a team through an open area, such as a street or courtyard. Different members of a patrol team are responsible for providing front, flank, or rear security. Once something of interest is found, targeted scanning motion is used to remain focused on it.

Figure 5:
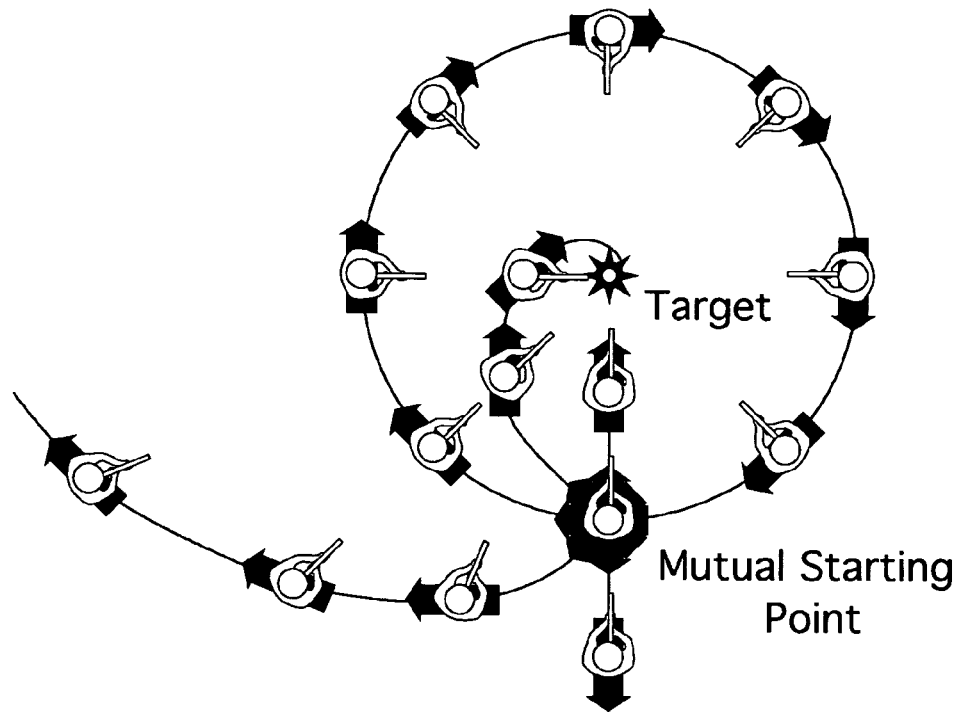
FIG. 5 illustrates conventional examples of targeted canted motion.

The tactics executed with conventional gamepads place a greater emphasis on moving sideways and spiralling towards or away from points of interest, due primarily to the limitations of the control as shown in FIG. 5. Once that difference was clear, we saw the opportunity to develop a small footprint, low cost virtual locomotion control using conventional input devices that could better approximate the kinds of movements involved in tactical infantry maneuvers. The resulting control can benefit any application where it is useful to freely look around while continuing to move.

It is also an advantage that a small space is required for using this apparatus, and equipment needed for the apparatus is inexpensive when compared to virtual locomotion controls such as Gaiter that track multiple segments of the user's body, provide a tracked rifle prop, and allows the user to stand and turn in place.

Obviously many modifications and variations of the present invention are possible in the light of the above teachings. It is therefore to be understood that the scope of the invention should be determined by referring to the following appended claims.

What is claimed is:

1. An apparatus for controlling the movements of a vehicle having on-board controls for independently controlling the course and heading of the vehicle in response to a remote operator's control and an on-board camera/video transmitter for recording and transmitting a video stream of the camera's view of the physical environment within which the vehicle is operating, comprising:

a gamepad comprising a first joystick and a second joystick and having a plurality of outputs responsive to user-controlled movements of the first and the second joystick and one or more user-controlled buttons, wherein the first joystick is mapped to provide an open loop directional control over steering of the vehicle, the second joystick is mapped to provide an open loop directional control over offset of the vehicle to thereby provide an open-loop control over the vehicle course and heading;
a tracker configured to control a head-pose of the remote vehicle as an open-loop control by providing yaw, pitch, and roll orientation angles as outputs;
a processor comprising a control mapping algorithm and a remote vehicle controller, wherein the control mapping algorithm is configured to map the gamepad and the tracker outputs to control the course, heading, displacement, and head-pose of the remote-controlled vehicle, and the remote vehicle controller sends commands to the on-board controls to direct the movement of the remote vehicle; and
a display for receiving the video stream and displaying the movement of the vehicle to the operator.

2. An apparatus as in claim 1, wherein the remote control vehicle includes a turret, the remote vehicle controller includes control over the head-pose of the turret, and the processor further comprises control mapping the head-pose of the turret of the remote vehicle as a directional open-loop heading control.

3. An apparatus as in claim 1, wherein the second joystick is mapped to provide a course-offset.

4. An apparatus as in claim 1, wherein the second joystick is mapped to provide a heading-offset.

5. An apparatus as in claim 1, wherein the tracker is attached to the gamepad.

6. An apparatus as in claim 5, wherein the vehicle moves in accordance to a computed situated-heading and the head-pose.

7. An apparatus as in claim 1, wherein the display is a head mountable display and the tracker is attached thereto.

8. An apparatus as in claim 7, wherein the vehicle moves in accordance to a computed situated-heading and the head-pose.

9. An apparatus as in claim 1, wherein the display is a head-mountable display and further comprising a video rendering system for providing a mono or stereo video image to the head-mountable display.

10. An apparatus as in claim 1, wherein the display is a desk-top monitor display and further comprising a video rendering system for providing a mono or stereo video image to the desk-top monitor display.

11. An apparatus as in claim 1, further comprising a pair of sliding foot pedals having an output mapped to provide open-loop translational control of a displacement of the vehicle.

12. An apparatus as in claim 1, wherein the movements of the vehicle are displayed as three dimensional.

13. A control mapping system for mapping a plurality of a user-controlled dual joystick gamepad and tracker outputs to a movement of a vehicle in a physical environment, comprising:
a control mapping algorithm for mapping the user-controlled movements of a first joystick, a second joystick, and a tracker to a vehicle course, heading, displacement, and head-pose, wherein the first joystick is mapped to provide an open loop directional control over steering of the vehicle, the second joystick is mapped to provide an open loop directional control over offset of the vehicle to thereby provide an open-loop control over the vehicle's course and heading, and the tracker is mapped to control a head-pose of the vehicle as an open-loop control by providing yaw, pitch, and roll orientation angles.

14. A control mapping system as in claim 13, further comprising a processor for running a virtual environment software program displaying the vehicle in a physical environment in which the vehicle is programmed to move with a course, heading, displacement, and head-pose.

15. A control mapping system as in claim 13, wherein the second joystick is mapped to provide a course-offset.

16. A control mapping system as in claim 13, wherein the second joystick is mapped to provide a heading-offset.

17. A control mapping system as in claim 13, wherein the vehicle moves in accordance to a computed situated-heading and the head-pose.

18. A method for controlling the movements of a vehicle using a tracker and a gamepad comprising a first joystick a second joystick, and having a plurality of outputs responsive to user-controlled movements of each joystick, the tracker, and user-controlled buttons, comprising:
recording and transmitting a video stream of the vehicle's camera view of the physical environment within which the vehicle is operating to a processor;
programming the processor with a control mapping algorithm for mapping the user-controlled movements of each joystick and tracker to a vehicle course, heading, displacement, and head-pose, wherein the first joystick is mapped to provide a steering control of the vehicle, the second joystick is mapped to provide an offset control of the vehicle to thereby provide an open-loop control over the vehicle, and the movement of the tracker is mapped to control a head-pose of the vehicle as an open-loop control by providing yaw, pitch, and roll orientation angles;
transmitting a vehicle control signal to on-board vehicle controls; and
displaying the movement of the vehicle in the physical environment.

19. A method as in claim 18, wherein the remote control vehicle includes a turret, the remote vehicle controller includes control over the head-pose of the turret, and the processor further comprises control mapping the head-pose of the turret of the remote vehicle as a directional open-loop heading control.

20. A method as in claim 18, wherein the second joystick is mapped to provide a course-offset.

21. A method as in claim 18, wherein the second joystick is mapped to provide a heading-offset.

22. A method as in claim 18, wherein the tracker is attached to the gamepad.

23. A method as in claim 22, wherein the vehicle moves in accordance to a computed situated-heading.

24. A method as in claim 18, wherein the tracker is attached to a head-mountable display.

25. A method as in claim 24, wherein the vehicle moves in accordance to a computed situated-heading.

26. A method as in claim 18, further comprising providing a mono or stereo video image to a head-mountable display.

27. A method as in claim 18, further comprising providing a mono or stereo video image to a desk-top monitor display.

28. A method as in claim 18, further comprising control mapping an output of a pair of sliding foot pedals to provide open-loop control of a translational displacement of the vehicle.

29. A method as in claim 18, wherein the movements of the vehicle are displayed as three dimensional.

30. An apparatus for controlling the movements of a vehicle having on-board controls for independently controlling the course and heading of the vehicle in response to a remote operator's control and an on-board camera/video transmitter for recording and transmitting a video stream of the camera's view of the physical environment within which the vehicle is operating, comprising:

- a first and a second dual axis directional input control device having a plurality of outputs responsive to user-controlled operations of the directional control axes and user-controlled buttons;
- a third directional input control device that is mapped to direct a head-pose of the vehicle as an open-loop control by providing yaw, pitch, and roll orientation angles as outputs;
- a processor for running a remote vehicle control software program which sends commands to the vehicle's on-board controls to direct the movement of the remote vehicle;
- a control mapping algorithm for mapping the outputs of the directional input control devices to the vehicle's course and heading, wherein the directional control axes are mapped to provide open loop directional control of the vehicle's course and heading; and
- a display for receiving the video stream and displaying the view from the vehicle's cameras to the operator.

31. An apparatus as in claim 30, wherein the vehicle includes a turret, the remote vehicle controller includes control over the head-pose of the turret, and the processor further comprises control mapping the head-pose of the turret of the remote vehicle as a directional open-loop heading control.

32. An apparatus as in claim 30, wherein a first directional input control device is mapped to provide open loop directional control over steering the vehicle and a second directional input control device is mapped to provide open loop directional control over a heading offset.

33. An apparatus as in claim 30, wherein a first directional input control device is mapped to provide open loop directional control over steering the vehicle and a second directional input control device is mapped to provide open loop directional control over a course offset.

34. An apparatus as in claim 30, wherein a first directional input control device is mapped to provide open loop directional control over the vehicle's heading and a second directional input control device is mapped to provide open loop directional control over the vehicle's course.

35. An apparatus as in claim 30, wherein the third directional input control device is a tracker attached to the gamepad to direct the head-pose of the vehicle as an open-loop control.

36. An apparatus as in claim 30, wherein the display is a head mountable display and comprises a tracker attached thereto to direct the head-pose of the vehicle as an open-loop control.

* * * * *